(12) United States Patent
Leonardi et al.

(10) Patent No.: US 8,186,135 B2
(45) Date of Patent: May 29, 2012

(54) ELECTRICALLY-POWERED COMBINATION LAWN MOWER, TRIMMER AND EDGER

(75) Inventors: Joseph A. Leonardi, Auburn, NY (US); Bruce C. Jordan, Auburn, NY (US)

(73) Assignee: Leonardi Manufacturing Co. Inc., Weedsport, NY (US)

( * ) Notice: Subject to any disclaimer, the term of this patent is extended or adjusted under 35 U.S.C. 154(b) by 0 days.

(21) Appl. No.: 12/824,856

(22) Filed: Jun. 28, 2010

(65) Prior Publication Data

US 2010/0326032 A1    Dec. 30, 2010

Related U.S. Application Data

(60) Provisional application No. 61/200,779, filed on Jun. 26, 2009.

(51) Int. Cl.
*A01D 34/00* (2006.01)
(52) U.S. Cl. .................................................. 56/12.7
(58) Field of Classification Search .............. 56/12.7, 56/16.9, 255, 320.1; 30/276
See application file for complete search history.

(56) References Cited

U.S. PATENT DOCUMENTS

| | | | |
|---|---|---|---|
| 2,608,043 A * | 8/1952 | Berdan | 56/17.2 |
| 2,734,325 A * | 2/1956 | Bonte | 56/16.9 |
| 2,867,960 A * | 1/1959 | Stiles et al. | 56/17.2 |
| 2,938,323 A * | 5/1960 | Shaver et al. | 56/16.9 |
| 3,103,093 A | 9/1963 | House, Jr. | |
| 3,350,864 A * | 11/1967 | Sheps et al. | 56/16.9 |
| 3,561,199 A * | 2/1971 | Lay | 56/17.1 |
| 3,803,819 A * | 4/1974 | Ehrlich | 56/17.1 |
| 4,077,191 A | 3/1978 | Pittinger, Sr. et al. | |
| 4,227,280 A | 10/1980 | Comer | |
| 4,442,659 A | 4/1984 | Enbusk | |
| 4,586,257 A | 5/1986 | Rittenhouse | |
| 4,607,431 A | 8/1986 | Gay | |
| 4,642,976 A * | 2/1987 | Owens | 56/16.9 |
| 4,688,376 A | 8/1987 | Wolfe, Sr. | |
| 4,703,613 A | 11/1987 | Raymond | |
| 4,869,054 A | 9/1989 | Hostetler et al. | |
| 4,936,886 A | 6/1990 | Quillen | |
| 4,949,536 A * | 8/1990 | Neufeld | 56/13.7 |
| 5,161,353 A | 11/1992 | Bergkamp et al. | |
| 5,263,303 A | 11/1993 | Stroud | |
| 5,287,683 A | 2/1994 | Smith | |
| 5,309,701 A * | 5/1994 | McGuerty | 56/16.9 |
| 5,321,938 A | 6/1994 | LeBlanc | |
| 5,491,962 A | 2/1996 | Sutliff et al. | |

(Continued)

FOREIGN PATENT DOCUMENTS

DE    2556553    6/1977

(Continued)

*Primary Examiner* — Arpad Fabian-Kovacs
(74) *Attorney, Agent, or Firm* — George R. McGuire; David B. Woycechowsky; Bond Schoeneck & King

(57) ABSTRACT

An electrically powered two wheel mowing, trimming and edging apparatus is disclosed. A rotating cutting head is cantilevered in front of the wheels, with a battery positioned behind the wheels to act as a counterweight to the cutting head. A caster below the battery allows easy maneuverability and permits trimming in corners. The cutting head contains both metal cutting blades and filament line, and the operator selects which cutting tool he wants based on the type of foliage to be cut. The cutting head easily rotates from the horizontal to the vertical, allowing the apparatus to be used as an edge trimmer.

12 Claims, 15 Drawing Sheets

U.S. PATENT DOCUMENTS

| | | | |
|---|---|---|---|
| 5,649,413 | A | 7/1997 | Oostendorp |
| 5,906,051 | A | 5/1999 | Nannen |
| 5,970,694 | A | 10/1999 | Knox, Jr. |
| 6,442,845 | B2 | 9/2002 | Wheeler et al. |
| 6,460,253 | B1 | 10/2002 | Wheeler et al. |
| 6,691,792 | B2 | 2/2004 | Keane |
| 6,862,871 | B2 | 3/2005 | Morabit et al. |
| 6,938,699 | B2 | 9/2005 | Templeton |
| 7,107,745 | B2 | 9/2006 | Dunda |
| 7,360,350 | B1 | 4/2008 | Smith, Jr. |
| 2001/0027610 | A1* | 10/2001 | Wheeler et al. ............ 30/276 |
| 2002/0043058 | A1 | 4/2002 | McBlair |
| 2003/0041578 | A1 | 3/2003 | Fuller |
| 2003/0079455 | A1 | 5/2003 | Suchdev et al. |
| 2005/0193700 | A1 | 9/2005 | Bares |
| 2006/0123635 | A1 | 6/2006 | Hurley et al. |
| 2007/0000138 | A1 | 1/2007 | Baskar |
| 2007/0012462 | A1 | 1/2007 | Notaras et al. |
| 2007/0294991 | A1 | 12/2007 | Medina et al. |
| 2008/0092398 | A1 | 4/2008 | Hurley et al. |
| 2008/0168756 | A1 | 7/2008 | Nafziger |
| 2009/0049818 | A1 | 2/2009 | Farquhar |
| 2009/0090094 | A1 | 4/2009 | Million et al. |
| 2009/0173053 | A1 | 7/2009 | Stanley |

FOREIGN PATENT DOCUMENTS

| | | |
|---|---|---|
| GB | 2 000 672 | 1/1979 |
| WO | 9941966 | 8/1999 |

\* cited by examiner

Fig. 7A
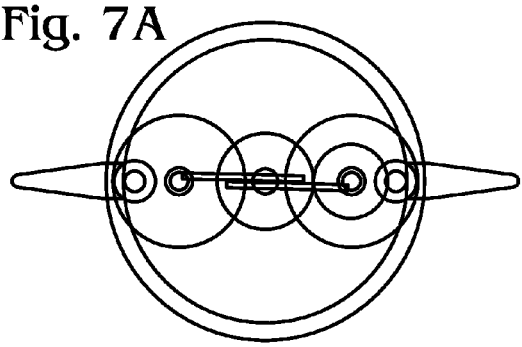
Fig. 7E
Fig. 7B
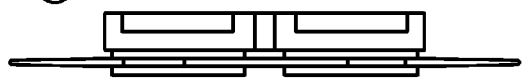
Fig. 7F
Fig. 7C
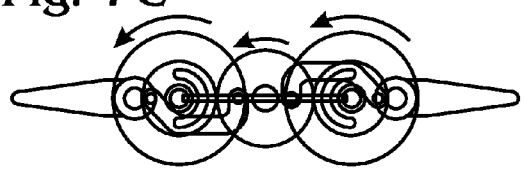
Fig. 7G
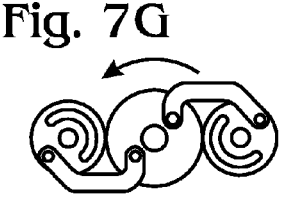
Fig. 7D
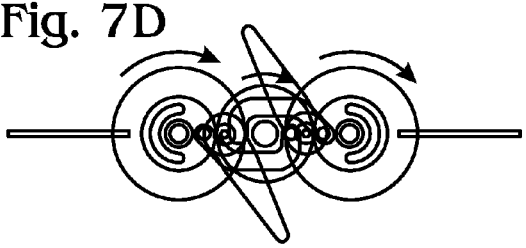
Fig. 7I
Fig. 7H
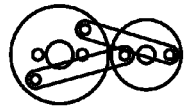
Fig. 7J
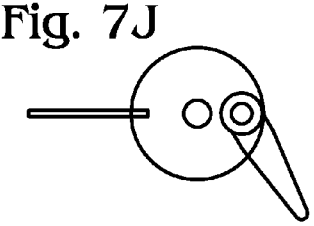
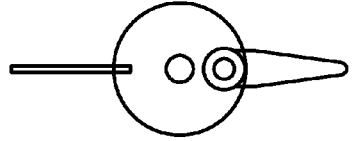

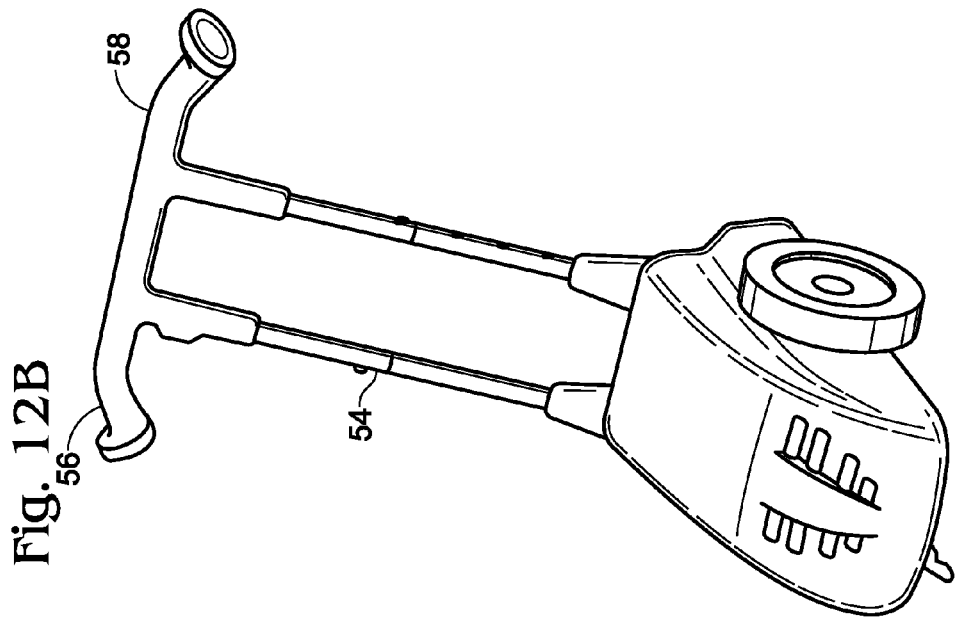
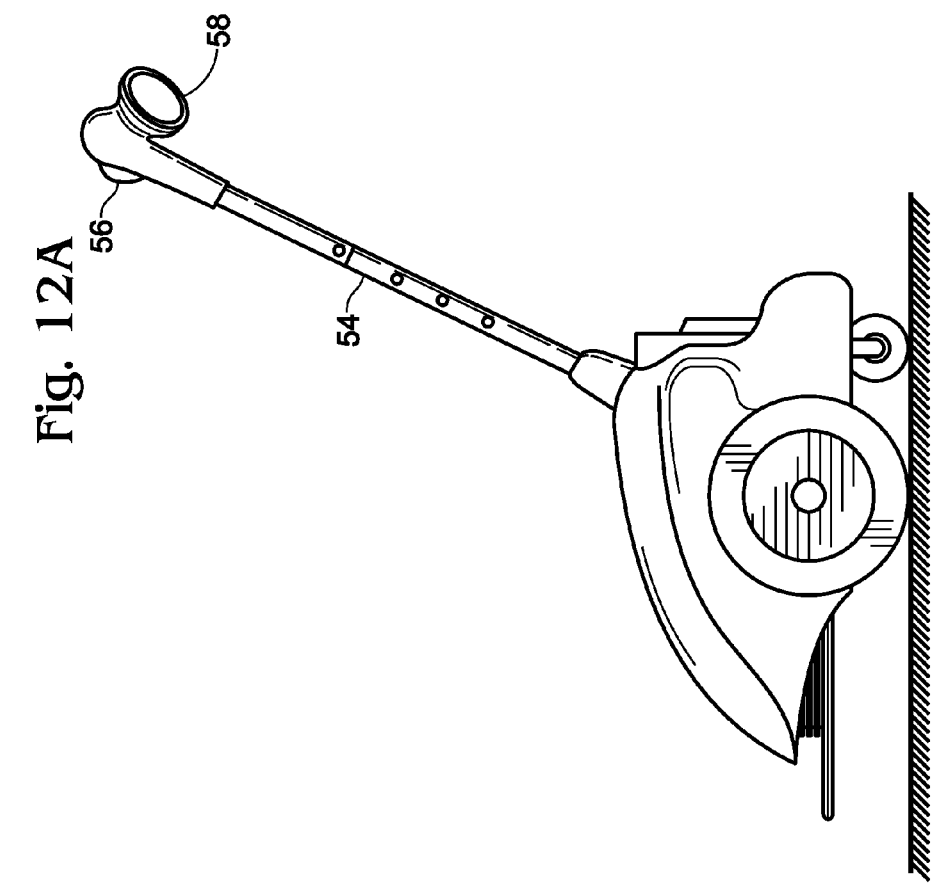

ELECTRICALLY-POWERED COMBINATION LAWN MOWER, TRIMMER AND EDGER

RELATED APPLICATION

The present application claims priority to U.S. provisional patent application No. 61/220,799, filed on 26 Jun. 2009; all of the foregoing patent-related document(s) are hereby incorporated by reference herein in their respective entirety(ies).

BACKGROUND OF THE INVENTION

1. Field of Invention

The present invention relates generally to lawn maintenance devices, and, more particularly, to lawn maintenance devices that can perform more than one task such as mowing, trimming and edging and can be easily changed from one mode of operation to another.

2. Description of Prior Art

In lawn maintenance, the three conventional operations are: (i) general lawn cutting; (ii) trimming areas near fences, buildings and the like; and (iii) edging to make a sharp edge along a walkway, driveway or the like. These three operations are conventionally, respectively performed on three different machines. For general lawn cutting, a gasoline powered push or riding mower is conventionally used. For trimming, a hand-held electric or gasoline powered filament line lawn trimmer is used. For edging, an electric or gasoline powered edge trimmer with a vertical metal blade is used. The use of three separate devices drives cost requirements and storage space requirements. The use of three separate devices also consumes time required for comprehensive lawn maintenance as the operator switches from one device to the next for the three operations set forth above. The hand-held line trimmer can be fatiguing to use for extended periods. The three machines are also often difficult to control properly, resulting in gouging of turf. The high required blade speed can result in damage to tree bark and to paint on fences and buildings. Also, if gasoline powered, the heavy vibration that results from using a hand-held trimmer can cause "hand-arm vibration syndrome" if the device is used for long periods. Finally, line trimmers cut by mashing the top of grass, rather than by making a clean cut. This mashing action can cause browning of grass tops. Filament line trimmers are often unusable in vegetation more robust than grass. Traditional edgers with vertical metal blades can cause damage to driveways and walkways if proper care and/or attention is not given.

Numerous attempts have been made to reduce the fatigue associated with traditional line trimmers by providing dollies or wheeled carriages for support. For example, V. D. Morabit in U.S. Pat. No. 6,862,871 discloses a two-wheel carriage device with an angled mounting bracket for attaching a standard hand-held line trimmer. While this device does reduce the fatigue associated with carrying a hand-held line trimmer, it is not suitable for mowing large swaths of lawn, and rotating the trimmer to the vertical to conduct edge trimming requires loosening of the attachment clamp, rotation of the line trimmer and retightening of the clamp, a time-consuming process.

Two wheel filament line devices that combine mowing and trimming are known. Such an apparatus is disclosed by R. O. Raymond in U.S. Pat. No. 4,703,613, where a horizontal cutting head can be tilted slightly to allow closer cutting near fences and buildings. However, this machine does not allow 90 degree rotation of the cutting head to facilitate edging, nor does it have a third wheel or other device to ensure level and even cutting height for large swath lawn mowing.

The previous problem is addressed by C. B. Pittinger in U.S. Pat. No. 4,077,191 which discloses a filament mower/trimmer in a four-wheel frame. This allows for a more stable and even cutting height for lawn mowing, but suffers from the limitation that since the filament line does not extend past the four wheels it cannot be used to trim close to a fence or building.

Other products and/or publications which may be prior art may include the following: (i) ElecTrim (Models 151590, 158000) trimmer product; (ii) Trim-A-Lawn Weed Blaster product; (iii) U.S. Pat. No. 5,906,051 ("Nannen"); (iv) U.S. Pat. No. 6,442,845 ("Wheeler"); (v) U.S. Pat. No. 5,263,303 ("Stroud"); (vi) U.S. Pat. No. 5,287,683 ("Smith"); (vii) U.S. Pat. No. 6,862,871 ("Morabit"); (viii) U.S. Pat. No. 5,970,694 ("Knox"); (ix) U.S. Pat. No. 5,491,962 ("Sutliff"); (x) U.S. Pat. No. 4,936,886 ("Quillen"); (xi) U.S. Pat. No. 4,688,376 ("Wolfe"); (xii) U.S. Pat. No. 4,442,659 ("Enbusk"); (xiii) U.S. Pat. No. 5,649,413 ("Oostendorp"); (xiv) UK published patent application GB2000672 ("Kalmar"); (xv) German patent related publication number DE2556553 (automated translation); (xvi) U.S. Pat. No. 4,607,431 ("Gay"); and/or (xvii) U.S. Pat. No. 4,227,280 ("Comer").

It is noted that FIG. 7 of Sutliff discloses an airfoil on its cutting blade. This air foil structure may be useful in conjunction with embodiments of the present invention (discussed below) because the air foil creates a drag on the cutting blade and thereby decreases its kinetic energy.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY OF THE INVENTION

In some preferred embodiments, the present invention (see DEFINITIONS section) is directed to a lawn maintenance machine with rotational lawn cutting head where the head is rotatable between a horizontal position and a vertical position. In some preferred embodiments, the present invention is directed to a lawn maintenance machine where: (i) a rotational cutting head is provided with both cutting blade(s) and trimming filament(s); (ii) the cutting blade(s) are moveable between a cutting position and a non-cutting position; and (iii) the trimming filament(s) are moveable between a trimming position and a non-trimming position. The present invention overcomes the aforementioned disadvantages of the prior art by providing an electrically powered, wheeled mower, trimmer and edger. This device places the battery power supply behind a wheel, or more preferably, two main wheels with a third caster under the battery, effectively cantilevering out the lighter cutting head ahead of the two main wheels.

It is an object of this invention to provide a mowing, trimmer and edging apparatus. In one position the cutting head is positioned horizontally and can be used for mowing large areas at an even cutting height. Since there are no front wheels to get in the way of the cutting head, the cutting head can be positioned next to fences and buildings, allowing effective trimming operations with none of the disadvantages of traditional line trimmers. Also, since there is a rear caster positioned beneath the heavy battery power supply, the push point is between the two main wheels and the caster, thus preventing the trimmer from wanting to tip, which allows faster pushing and easier pushing uphill. The caster also keeps the main forward deck at a set height, facilitating even cutting during large swath lawn mowing.

It is an object of this invention to provide a user operated hand-crank lever to reposition the cutting head from the horizontal to the vertical position without the operator having to bend over. This facilitates ease of use and rapid repositioning between the two cutting modes. Since the device can accommodate both mowing and trimming in the horizontal position and edging in the vertical position, the number of required devices for complete lawn care is reduced from three to one.

It is an object of this invention to provide two methods of horizontal cutting and trimming, one using traditional filament line and one using metal blades. This has the advantage of allowing the user to select, on the fly, which cutting method is best suited for the vegetation he is cutting and reducing the browning of grass tops caused by filament line.

It is an object of this invention to provide operator handles of adjustable height to maximize operator efficiency. Also, the handles have recessed storage compartments for storage of filament line in one handle and spare metal blades in the other.

In an alternative embodiment, another caster is used directly below the cutting head to provide added stability to the cutting deck.

In a second alternative embodiment, two retractable front wheels are used instead of the rear caster. This has the advantage of the added stability that four wheels provide over a three wheel embodiment for large scale mowing operations, while still allowing retraction of the front wheels for trimming near fencing and buildings.

In a third alternative embodiment, a 90 degree throw lever is used instead of the hand-crank lever for repositioning the cutting head from the horizontal to the vertical position.

In a fourth alternative embodiment, a servo motor or solenoid is used instead of the hand-crank lever or the 90 degree throw lever to reposition the cutting head from the horizontal to the vertical position.

In a fifth alternative embodiment, a gasoline engine instead of the electric motor is used to power the cutting head. The gasoline engine could either be on the main deck of the apparatus or on the forward deck that rotates to the vertical position.

In a sixth alternative embodiment, the two main wheels are positioned to the rear with a forward caster instead of the two main wheels forward with a rear caster.

According to one aspect of the present invention, a lawn maintenance machine includes: a frame; a set of wheel(s); a cutting head sub-assembly; a connection hardware set; a motor. The set of wheel(s) comprises at least one wheel rotatably connected to the frame so that the at least two wheels support the lawn maintenance machine in a horizontal position with respect to the ground. The cutting head assembly comprises a cutting head member and at least one cutting implement mechanically connected to the cutting head member;

The cutting head member defining a central axis and a first angular direction about its central axis. The cutting head member is mechanically connected to the motor so that rotation of the motor will drive the cutting head member to rotate in the first angular direction. The connection hardware set connects rotatably mechanically connects the cutting head member to the frame so that the cutting head member is rotatable in a second angular direction at least between a horizontal position (zero degrees) and a vertical position (+90 degrees).

According to a further aspect of the present invention, a lawn maintenance machine includes: a frame; a set of wheel(s); a cutting head sub-assembly; a connection hardware set; a motor. The set of wheel(s) comprises at least one wheel rotatably connected to the frame so that the at least two wheels support the lawn maintenance machine in a horizontal position with respect to the ground. The cutting head assembly includes a cutting head member, a first set of cutting implement(s) and a second set of cutting implement(s). The cutting head member defines a central axis and a first angular direction about its central axis. The cutting head member is mechanically connected to the motor so that rotation of the motor will drive the cutting head member to rotate in the first angular direction. The connection hardware set connects rotatably mechanically connects the cutting head member to the frame so that the cutting head member is rotatable in a second angular direction about a pivot axis aligned in the horizontal direction.

According to a further aspect of the present invention, a lawn maintenance machine includes: a frame; a cutting head sub-assembly; a motor; and an implement selection hardware set. The cutting head assembly includes a cutting head member, a first set of cutting implement(s) and a second set of cutting implement(s). The cutting head member defines a central axis and a first angular direction about its central axis. The cutting head member is mechanically connected to the motor so that rotation of the motor will drive the cutting head member to rotate in the first angular direction. The implement selection hardware set allows selection between the first set of cutting implement(s) and the second set of cutting implement(s). The implement selection hardware allows for switching between the first and second set of cutting implements without reversing a direction of rotation of the motor.

According to a further aspect of the present invention, a lawn maintenance machine includes: a frame; a cutting head sub-assembly; and a motor. The cutting head assembly includes a cutting head member, a first cutting implement member and a first gasket member. The cutting head member defines a central axis and a first angular direction about its central axis. The cutting head member is mechanically connected to the motor so that rotation of the motor will drive the cutting head member to rotate in the first angular direction. The first gasket member is elastic and resilient. The first cutting implement is mechanically connected to the head member in a non-rigid manner through the first gasket member.

According to a further aspect of the present invention, a lawn maintenance machine includes: a frame; a cutting head sub-assembly; and a motor. The cutting head assembly includes a cutting head member, a first cutting implement member and a first torsional bias member. The cutting head member defines a central axis and a first angular direction about its central axis. The cutting head member is mechanically connected to the motor so that rotation of the motor will drive the cutting head member to rotate in the first angular direction. The first cutting implement is mechanically connected to the head member through the torsional bias member so that the first cutting implement can rotate, in a biased manner, with respect to the cutting head member.

According to a further aspect of the present invention, a lawn maintenance machine includes: a frame; a cutting head sub-assembly; a motor; and a first wheel sub-assembly. The cutting head assembly includes a cutting head member and a first cutting implement member. The cutting head member defines a central axis, a central portion and a first angular direction about its central axis. The cutting head member is mechanically connected to the motor so that rotation of the motor will drive the cutting head member to rotate in the first angular direction. The first wheel sub-assembly is mechanically connected to the cutting head member under the central portion of the cutting head member.

According to a further aspect of the present invention, a lawn maintenance machine includes: a frame; a cutting head sub-assembly; an electric motor; a battery; and a first wheel sub-assembly. The cutting head assembly includes a cutting head member and a first cutting implement member. The cutting head member defines a central axis, a central portion and a first angular direction about its central axis. The cutting head member is mechanically connected to the electric motor so that rotation of the electric motor will drive the cutting head member to rotate in the first angular direction. The battery is electrically connected to the electric motor so that the battery powers the electric motor. The first wheel sub-assembly is mechanically connected to the frame under the battery.

BRIEF DESCRIPTION OF THE DRAWINGS

The present invention will be more fully understood and appreciated by reading the following Detailed Description in conjunction with the accompanying drawings, in which:

FIGS. 7A to 7J are various views of various cutting head assemblies according to the present inventions, showing various mechanisms for shifting between the metal cutting blades and the filament line.

FIG. 12A shows a perspective view of a seventh embodiment of a lawn maintenance machine according to the present invention; the seventh embodiment machine includes adjustable-height handles and a recessed storage compartment(s) for spare filament line and/or metal blades.

FIG. 12B is an orthographic side view of the seventh embodiment machine.

DETAILED DESCRIPTION

Figure 4:
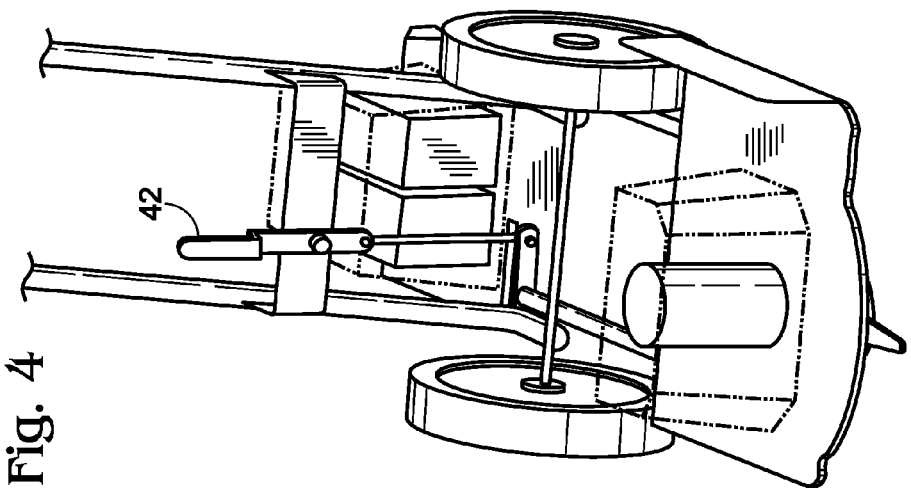
FIG. 4 is a perspective view of a second embodiment of a lawn maintenance machine according to the present invention with a 90 degree throw lever instead of a "hand-crank" type lever for rotating the cutting head to the vertical position.

FIGS. 1-3, 21 and 22 shows the invention in a preferred embodiment 10 ready for use for mowing or trimming. The device includes a pair of main wheels 12 mounted on the opposite ends of a horizontal axle 14. The battery power supply 16 is mounted on a horizontal deck 18 behind the main wheels 12. The cutting head 20 and electric drive motor 22 are situated forward of the main wheels 12 on a forward horizontal deck 24. The electric drive motor drives the cutting head in the rotational direction R2 (see FIG. 3) in order to perform mowing, trimming and/or edging operations.

Figure 1:
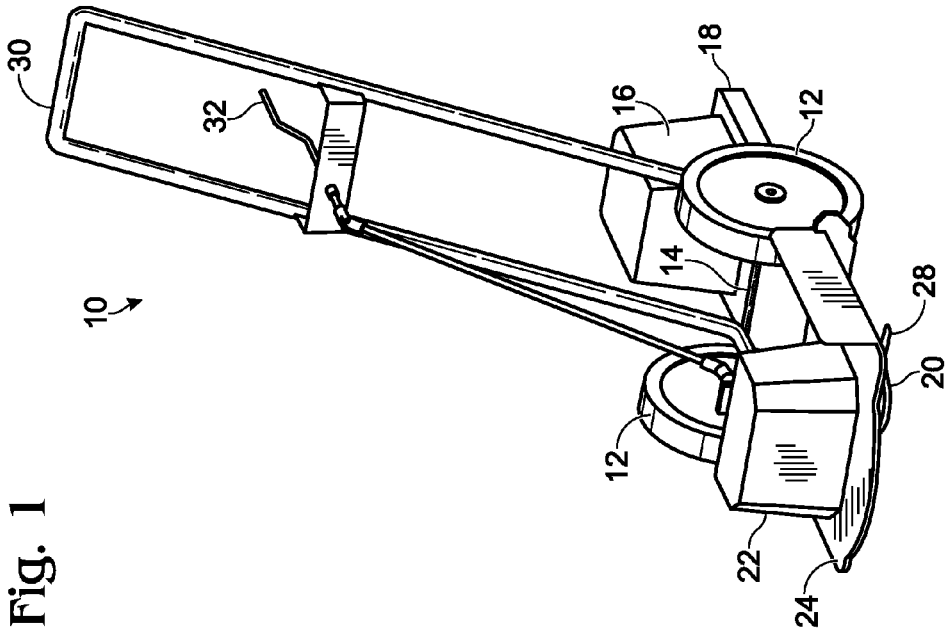
FIG. 1 is a perspective view of a first embodiment of a lawn maintenance machine according to the present invention, showing its various features with the cutting head in the horizontal mowing/trimming position. This view also shows the user-operable lever for rotating the cutting head to the vertical position.
Figure 3:
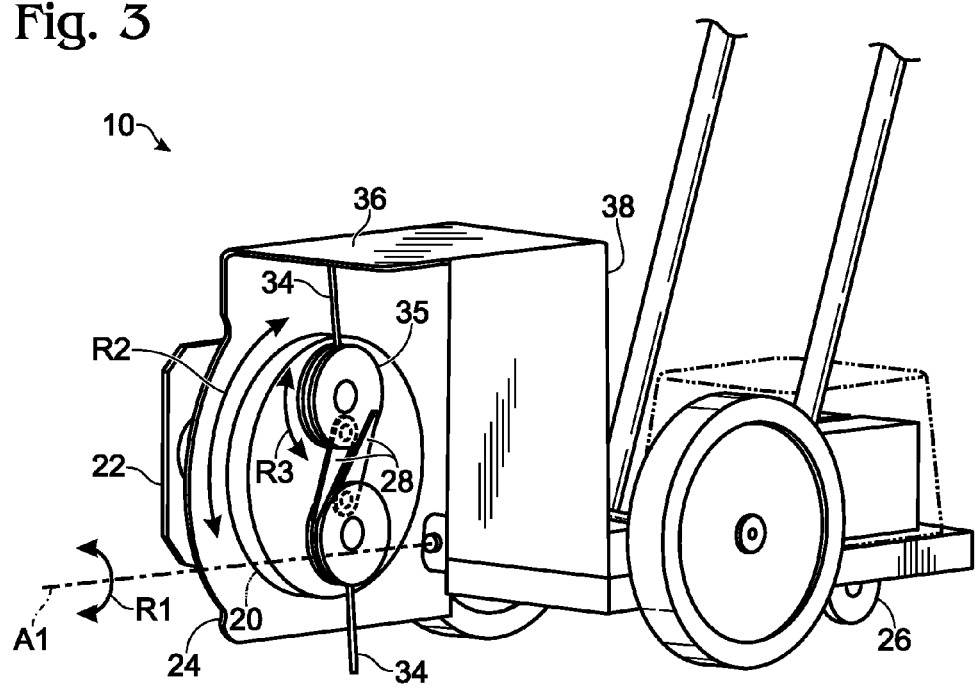
FIG. 3 is an orthographic side view of the first embodiment machine with the cutting head rotated to the vertical position for edging, showing the safety guard and the cutting head alignment, with the filament lines extended and the metal cutting blades retracted; this view also shows the rear caster used with the battery to cantilever the cutting head out in front of the two main wheels.

A rear caster 26 mounted under the battery power supply 16 is shown in FIG. 3. Since the battery power supply 16 is heavier than the cutting head 20/drive motor 22 assembly, the device 10 rests on the caster 26, which provides for an even cutting height when in operation and allows faster pushing and easier pushing uphill. As seen in FIG. 1, the cutting head 20 is cantilevered out forward of the main wheels 12, mounted below the electric drive motor 22. The use of an electric drive motor 22 removes the risk of the operator developing hand-arm vibration syndrome, a medical condition with symptoms of swelling and numbness in the hands and arms, caused by prolonged use of equipment powered by small reciprocating internal combustion engines.

In the embodiment of FIGS. 1-3, 21 and 22, cutting head 20 is rotatable between: (i) a horizontal position (see FIG. 1); and (ii) a vertical position (see FIGS. 2 and 3). More specifically, as shown in FIG. 3, the cutting head sub-assembly 20, 22, 24, 28, 34, 35 is rotatable about axis A1 in rotational direction R1 through a 90 degree range of rotational motion between the horizontal position and the vertical position, and the cutting head sub-assembly can be selectively and reliably secured in either the horizontal position or the vertical position. In other alternative embodiments, the cutting head sub-assembly may also be positioned into multiple angular positions between the horizontal position and the vertical position. In still other alternative embodiments, the cutting head sub-assembly may be moveable over a range of angles which may or may not include the horizontal and may or may not include the vertical. There may even be embodiments of the present invention where the cutting head sub-assembly does not rotate at all. Some embodiments of the hardware that can be used to rotate the cutting head sub-assembly will be further discussed below.

FIG. 3 shows the cutting blade(s) 28 (substantially rigid, preferably metal) and flexible filament(s) 34 (at least somewhat flexible, preferably synthetic). The cutting blade(s) 28 can be moved between: (i) a cutting position (where the blades extend radially outwardly of the body of the cutting head 20); and (ii) a non-cutting position (where the blades do not extend radially outwardly of the head). In the embodiment of FIGS. 1-3, 21 and 22, the trimming filament(s) are moved between the cutting position and the non-cutting position by rotation in the rotational direction R3. The flexible filament(s) 34 can be moved between: (i) a cutting position (where the filament(s) extend radially outwardly of the body of the cutting head 20); and (ii) a non-cutting position (where the filament(s) do not extend radially outwardly of the head). In the embodiment of FIGS. 1-3, 21 and 22 the filament(s) are moved between the cutting position and the non-cutting position by rotation in the rotational direction R3.

Figure 21:
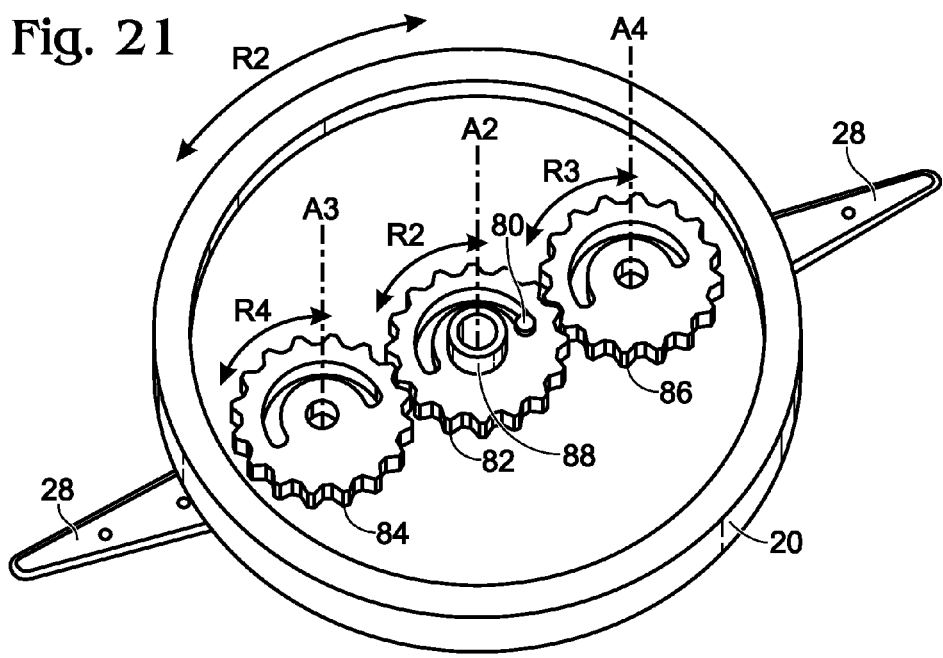
FIG. 21 is a perspective (generally top) view of the cutting head sub-assembly of the first embodiment machine.
Figure 22:
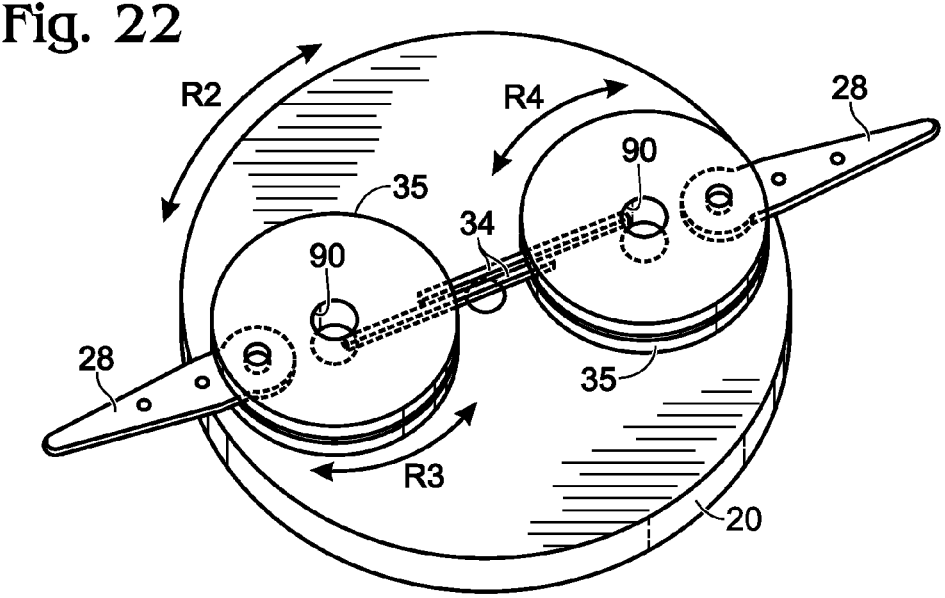
FIG. 22 is a perspective (generally bottom) view of the cutting head sub-assembly of the first embodiment machine.

As shown in FIG. 3, when blade-securing discs 35 are rotated in the counterclockwise-R3 direction to its limit of their range of R3 direction rotational motion, then the cutting blades 28 mechanically connected (see DEFINITIONS section) to the discs 35 will be in their non-cutting positions and the filaments 34 mechanically connected to these discs 35 will be in their cutting positions. As shown in FIGS. 21 and 22, when blade-securing discs 35 are rotated in the clockwise-R3 direction (clockwise when viewed from the perspective of FIG. 22; this would be the counterclockwise-R3 direction when viewed from the perspective of FIG. 21) to its limit of their range of R3 direction rotational motion, then the cutting blades 28 mechanically connected to the discs 35 will be in their cutting positions and the filaments 34 mechanically connected to these discs 35 will be in their non-cutting positions. In this way, the machine of FIGS. 1-3, 21 and 22 will either be cutting with its blades, or cutting with its filaments, or with both at the same time. In alternative embodiments of the present invention, a lawn maintenance machine may cut with one or more filaments and one or more blades at the same time.

One key feature of some embodiments of the present invention is that a different set of cutting implements (for example, various types of blades, various types of filaments) may be selectively used in operation at any given time. In the exemplary embodiment of FIGS. 1-3, 21 and 22, there are two sets of cutting implements, with a first set of cutting implements being made up of two flexible filaments and the second set of cutting implements being made up of two metal blades. However, there could be more than two alternative sets of cutting implements. Also, every alternative set of cutting implements could be made up entirely of blades, or every alternative set of cutting implements could be made up entirely of filaments, or the alternative sets of cutting implements could "mix and match" blades, filaments and/or or other types of cutting implements (for example, fluid streams or laser beams) now known or to be developed in the future. As one example of an embodiment of the present invention with all blades and no filaments, multiple alternative sets of cutting blades may be used in order to extend the time between the time that dulled cutting blades would need to be sharpened or changed—that is, the user could switch to an alternative set of blades when the first set had become dulled through use. Some embodiments of the present invention may have only a single set of cutting implements. Some embodiments of the hardware that can be used to select between alternative sets of cutting implements will be further discussed below.

Now that the alternative positions of the cutting head sub-assembly and the selection of alternative sets of cutting implements have been discussed, the lawn maintenance operations of the lawn maintenance machine of FIGS. 1-3, 21 and 22 will now be identified. When the cutting head sub-assembly is horizontal, and the cutting blade(s) are selected as the cutting implement, the operation of the machine would either be referred to as bladed mowing (if the blades do not extend past radially past the footprint of deck 24) or bladed trimming (if the blades do extend past radially past the footprint of deck 24). When the cutting head sub-assembly is horizontal, and the filament(s) are selected as the cutting implement, the operation of the machine would either be referred to as filament mowing (if the filaments do not extend past radially past the footprint of deck 24) or filament trimming (if the filaments do extend past radially past the footprint of deck 24). When the cutting head sub-assembly is vertical, and the cutting blade(s) are selected as the cutting implement, the operation of the machine would be referred to as bladed edging. When the cutting head sub-assembly is vertical, and the filament(s) are selected as the cutting implement, the operation of the machine would be referred to as filament edging.

A lightweight metal frame 30 is used to push the device 10, and there is a "hand-crank" lever 32 to rotate the cutting head sub-assembly between the horizontal to vertical positions. With the cutting head sub-assembly in the horizontal position, the operator can conduct both wide swath mowing as well as trimming, as there are no front wheels to get in the way of the cutting blades 28. The operator can select either the metal blades 28 or filament lines 34 (FIG. 4) as the cutting tool as vegetation conditions dictate through a motor rotation selection switch (not shown). When rotating one way the metal blades 28 are extended and the filament lines 34 are retracted and in the other direction the filament lines 34 are extended and the metal blades 28 are retracted.

Figure 2:
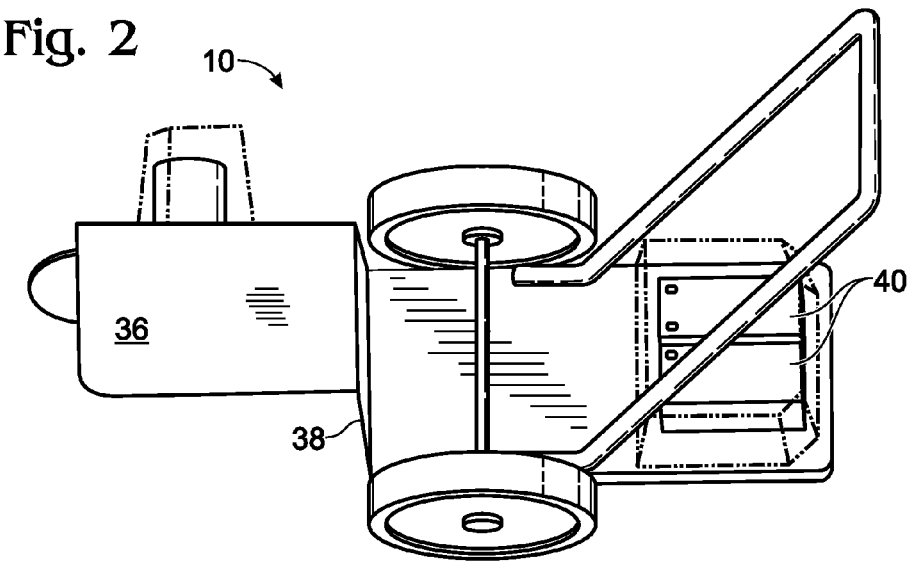
FIG. 2 is an orthographic top view of the first embodiment machine with the cutting head rotated to the vertical position for edging.

FIG. 2 shows the invention with the cutting head 20 rotated to the vertical position for edging operations. In this configuration there is a horizontal guard 36 and a vertical guard 38 that rotate into place with the cutting head 20, drive motor 22, and forward deck 24 to protect the operator from flying debris. The battery cells 40 are shown inside the battery power supply housing 16. The battery cell(s) may be any type now known or to be developed in the future. Alternatively other energy sources (now known or to be developed in the future) could be used, such as fuel cells, a nano-scale steam engines or large capacitors.

FIG. 3 shows the cutting head 20 rotated to the vertical position for edging. In the vertical position a mechanical interlock (not shown) allows only the use of filament line 34 for edging operations to prevent the metal blades 28 from damaging driveways or sidewalks. The metal cutting blades 28 are rotated to their stowed position to allow the filament line 34 to do the cutting. The horizontal guard 36 and vertical guard 38 that rotate with the cutting head 20 protect the operator from debris thrown backwards or upwards towards the operator.

The hardware and connections for selecting which set of cutting implements (that is, blades or filaments) will now be discussed in connection with FIGS. 21 and 22. As shown in FIGS. 21 and 22, the cutting head sub-assembly of the lawn maintenance machine embodiment of FIGS. 1-3, 21 and 22 includes: head member 20, blades 28; filaments 34; discs 35; stop 80; first gear 82; third gear 84; second gear 86; and center post 88.

In operation, the center post and first gear can be translated relative to each other, along the direction A2, between: (i) an engaged position; and (ii) a disengaged position. In the disengaged position, center post and head member 20 are free to rotate relative to the first gear, and the spinning of the head member will not cause any motion in the gear train shown in FIG. 21. In the engaged position, the rotation of the center post, in the R2 direction, will cause the first gear to rotate with the post in the R2 direction. As shown in FIG. 21, the center post has rotated the first gear in the counterclockwise-R2 direction (in the perspective of FIG. 21) until stop 80 has come into interfering contact with the first gear and prevented further counterclockwise-R2 rotation of the first gear. This counterclockwise-R2 rotation in the first gear causes: (i) clockwise-R3 rotation (in the perspective of FIG. 21) about axis A4 in second gear 86; and (ii) clockwise-R4 rotation (in the perspective of FIG. 21) about axis A3 in third gear 84. This clockwise-R3 rotation of the second gear and clockwise-R4 rotation of the third gear causes the discs 35 to rotate so that blades 28 are in the cutting position and filaments 34 are in the non-cutting position (see FIG. 22).

If the center post is again temporarily engaged with first gear 82 and rotated in the clockwise-R2 direction (in the perspective of FIG. 21), then the second and third gears and the discs will be driven to rotate, with respect to head member 20, so that: (i) the blades retract back radially within the footprint of the head member to their non-cutting positions; and (ii) the filaments rotate radially outwards of the footprint of the head member to their cutting position. In this way, two alternative sets of cutting implements can be alternatively selected for use depending on the particular lawn maintenance task that is desired to be performed.

Figure 25:
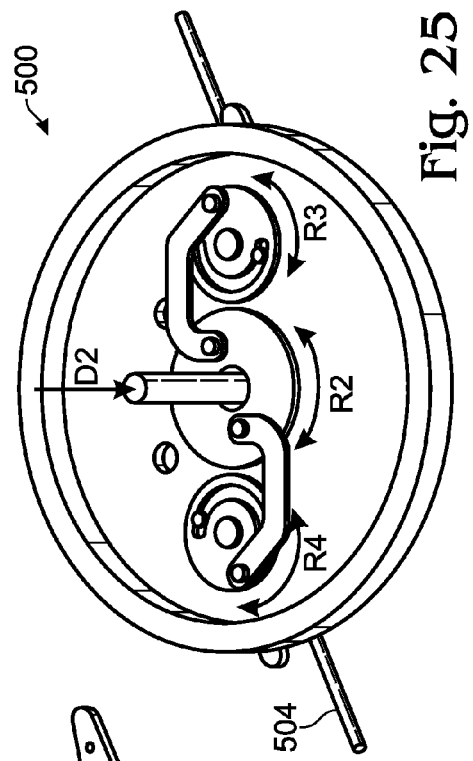
FIG. 25 is another perspective view of the third embodiment cutting head sub-assembly.
Figure 23:
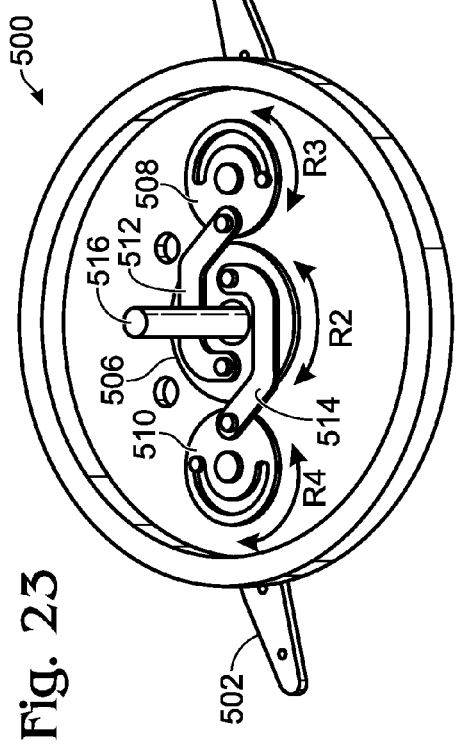
FIG. 23 is a perspective view of a third embodiment of a cutting head sub-assembly for use in the present invention.
Figure 24:
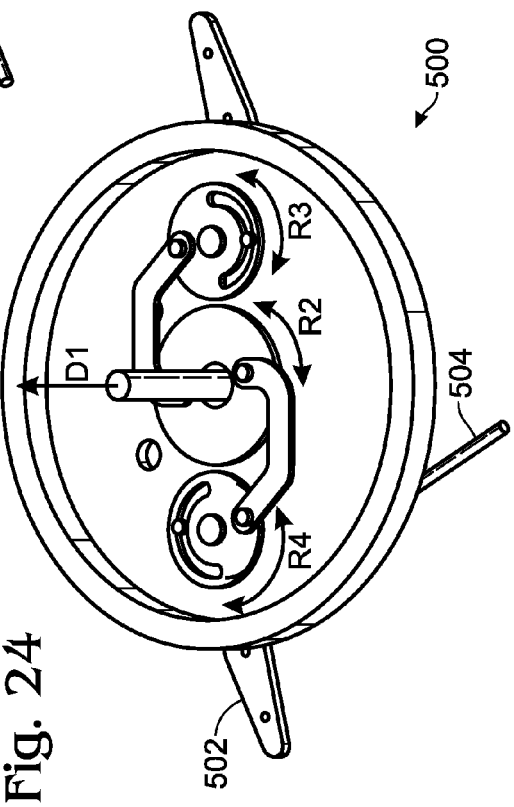
FIG. 24 is another perspective view of the third embodiment cutting head sub-assembly.

FIGS. 23-25 show another embodiment of a cutting head sub-assembly 500 that allows for selection between alternative sets of cutting implements. Sub-assembly 500 includes: blades 502; filaments 504; first disc 506; second disc 508; third disc 510; first crank 512; second crank 514; and center post 516. FIG. 24 shows how the center post engages with the first disc when it moves in the D1 direction, relative to the first disc, to key up with the first disc. FIG. 25 shows how the center post disengages from the first disc when it moves in the D2 direction, relative to the first disc, undo the keying of the first disc. The cranks 512, 514 are sized, shaped and connected so that clockwise-R2 motion of the first disc will cause clockwise-R3 motion in second disc 508, and clockwise-R4 motion in third disc 510. Conversely, counterclockwise-R2 motion of the first disc will cause counterclockwise-R3 motion in second disc 508, and counterclockwise-R4 motion in third disc 510. These R3 and R4 direction rotational motions serve to select between the two sets of cutting implements, blades 502 and filaments 504.

Now that gears (see FIG. 21) and crank linkages (see FIGS. 23-25) have been discussed as two possible ways of selecting between alternative sets of cutting implements, yet another possibility will be mentioned. Specifically, torsion springs may be used at the rotational interfaces 90, shown at FIG. 22, to rotationally secure discs 35 to head member 20 in a rotationally biased manner. Through the use of torsion springs at these rotational interfaces, the speed of rotation of the head member will effectively control which set of cutting implements will be in the cutting position and which set of cutting implements will be in the non-cutting position. When the cutting head is rotated at a low speed, then centrifugal forces in the blades will only overcome the bias force of the torsion spring at locations 90 to a limited extent, and will only rotate the discs 35 so that the blades are in a cutting position (as shown in FIG. 22). When the head member is rotated at a higher speed, the centrifugal forces increase, to more fully overcome the torsional bias of the springs at locations 90, and the discs 35 will rotate so that the blades rotate into the non-cutting positions and the filaments rotate out into the cutting position. Other centrifugal-force-generating weights and/or additional torsion springs can be used to create other configurations where cutting implement selection is performed differently and/or more precisely. The torsion springs of locations 90 in FIG. 22 may be used in addition to torsion springs for mounting the blade, as will be discussed below in connection with the embodiments of FIGS. 13-18.

Figure 19:
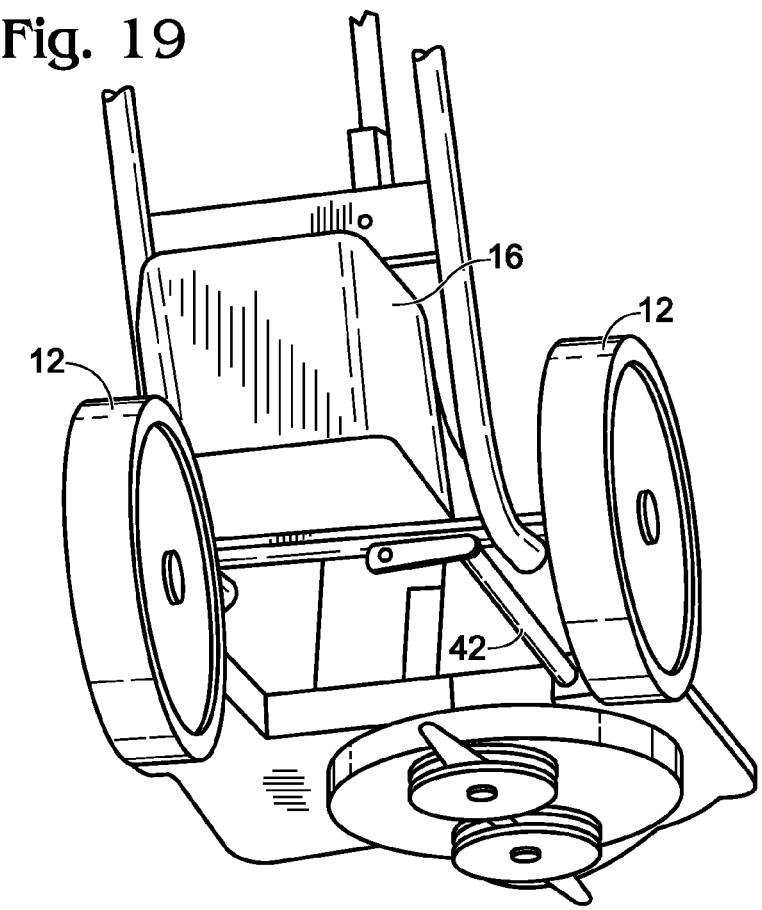
FIG. 19 is another perspective view of the second embodiment machine.
Figure 20:
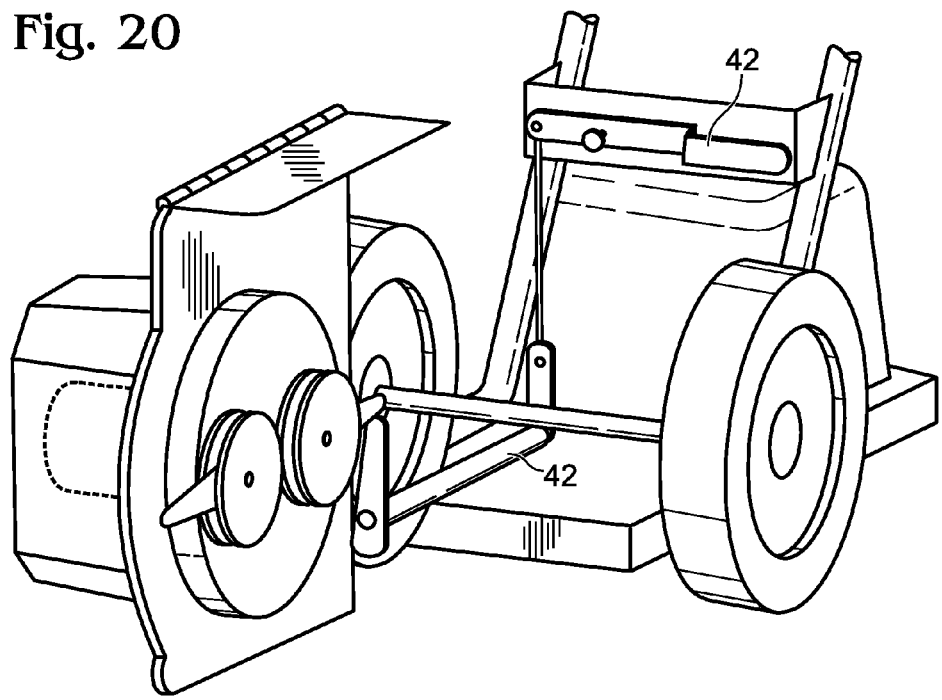
FIG. 20 is another perspective view of the second embodiment machine.

FIGS. 4, 6, 19 and 20 show an embodiment of a lawn maintenance machine according to the present invention, the machine including: cutting blades 28; filaments 34; and throw lever sub-assembly 42. The embodiment of FIGS. 4, 6, 19 and 20 is largely similar to embodiment 10 discussed above. In the embodiment of FIGS. 4, 6, 19 and 20, throw lever sub-assembly 42 is used to rotate the cutting head sub-assembly between the horizontal and vertical positions. The 90 degree throw lever 42 has the advantage that it is much simpler to fabricate and inherently simpler in operation 32. The throw lever may also be more suitable to embodiments of the present invention where the cutting head sub-assembly is to be securable in intermediate angular positions between the vertical and horizontal (or even positions past the vertical and/or past the horizontal). As best shown in FIG. 19, the embodiment of FIGS. 4, 6, 19 and 20 includes only two wheels 12, and no casters under its battery 16. Alternatively, this throw lever lawn maintenance machine embodiment could be equipped with one or more additional wheels and/or casters.

Figure 6:
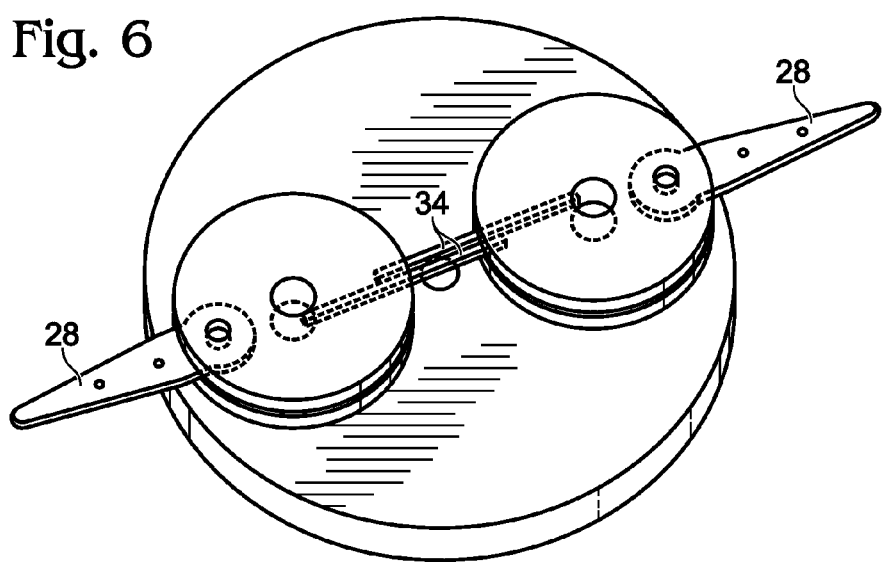
FIG. 6 is a perspective (generally bottom) view of the cutting head assembly of the second embodiment machine.

FIG. 6 shows the detail of the bottom of the cutting head 20. In this mode of operation the user has selected the metal cutting blades 28 as the best choice for the vegetation at hand and they are extended and ready to start cutting. The filament lines 34 are retracted and will not interfere with the operation of the metal blades 28.

Figure 5A:
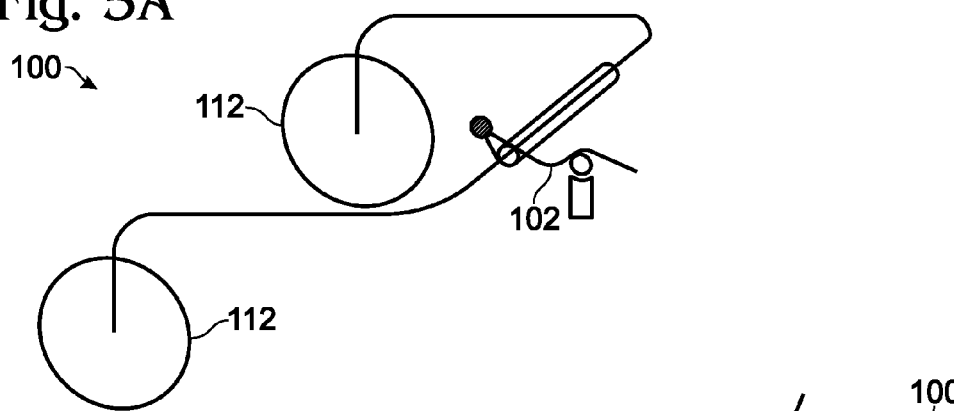
FIG. 5A is a detail view of a pull cable which may be used in conjunction with the present invention.
Figure 5B:
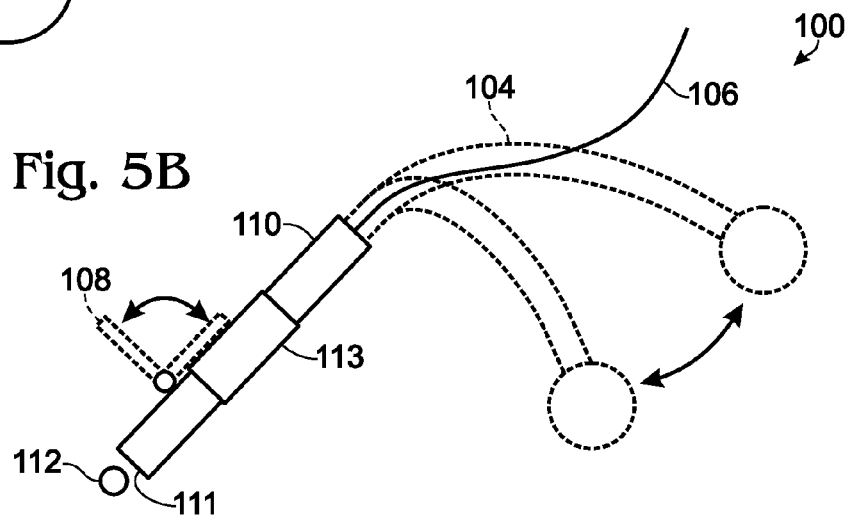
FIG. 5B is a detail view of a retractable shock tube and carry handle which may be used in conjunction with the present invention.

FIGS. 5A and 5B show a retractable wheel sub-assembly 100 that may be used in various embodiments of the present invention. These retractable front wheels may provide added stability to the front of lawn maintenance machines according to the present invention while still allowing for trimming through temporary retraction of the wheels. retractable wheels sub-assembly 100 includes: pull cable 102; carry handle 104; cable pull sleeve 106; hinge 108; retractable shock tube 110; swivel connection hardware 111; wheels 112; and ball-spring sub-sub-assembly 113. To operate the retractable wheels, the collar is first released and then a leg is pulled up. There may or may not be some type of locking mechanism. A hinge up double cable configuration may be used or a cable one way spring return configuration may be used. Other types of retractable wheel assemblies (now known or to be developed in the future) may be used. More generally speaking, retractable wheels are a preferred feature of some embodiments of the present invention because having more wheels provides additional stability and support for greater ease of use, but having fewer wheels on the ground allows for more precise control of the cutting. Retractable wheels give the user some flexibility in making this operational trade-off, which flexibility can be especially important in embodiments of the present invention that do more than one of the following possible lawn maintenance operations: blade mowing, blade trimming, filament mowing, filament trimming, blade edging and/or filament edging.

FIG. 7 shows the detail of the mechanism used to shift the cutting head 20 from a metal blade 28 only operating regime to a filament line 34 only cutting regime. FIG. 7A shows the bottom detail with the metal blades 28 extended similar to FIG. 6. FIG. 7B shows a side view of the cutting head 20 with the metal blades 28 extended and the filament line 34 retracted. FIG. 7C shows the detail of the cutting head 20 switching mechanism, with the metal blades 28 extended but commencing rotation to the stowed position. The disc or gear carrying the metal blades 28 will rotate counterclockwise 180 degrees to shift the metal blades 28 to the stowed position and extend the filament lines 34. FIG. 7D shows the cutting head 20 with the metal blades 28 in the stowed position and the filament lines 34 extended, and indicates that to reverse the process and extend the metal blades 28, the gears or discs will have to be rotated in the clockwise direction in the amount of 180 degrees. FIG. 7E shows the cutting head 20 positioned with the metal blades 28 in the extended positioned with the metal blades 28 and the filament lines 34 removed for clarity. FIG. 7F shows the cutting head 20 positioned with the filament lines 34 extended and the metal blades 28 retracted, with the metal blades 28 and filament lines 34 removed for clarity. Finally, FIG. 7G shows the cutting head 20 in the process of shifting from a metal blades 28 extended mode to a metal blades 28 stowed and filament lines 34 extended mode, with the gears or discs travelling counterclockwise.

Figure 8A:
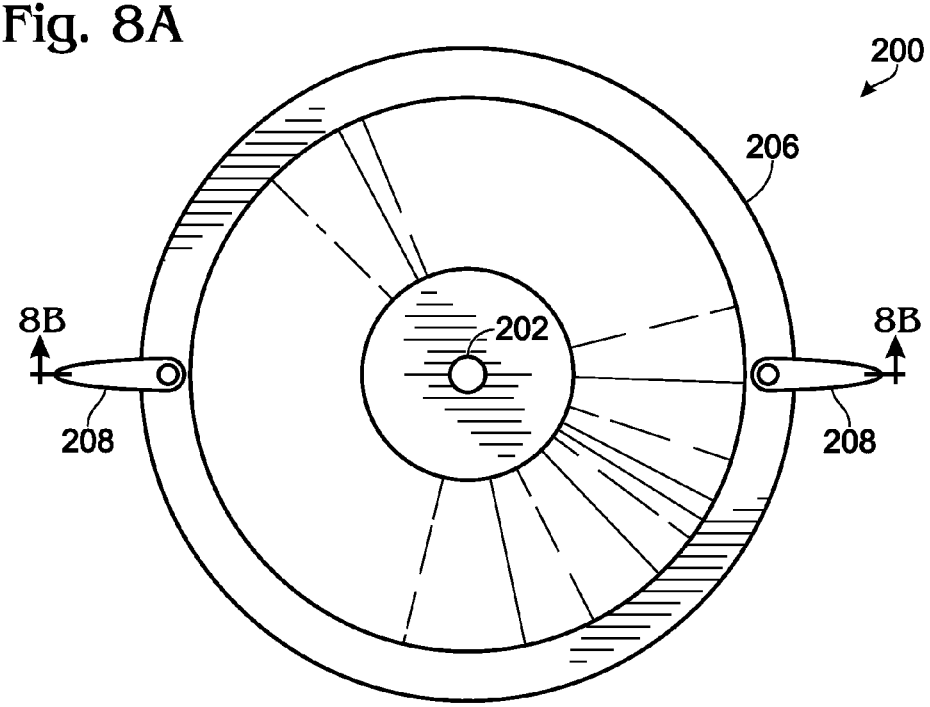
FIG. 8A is a detail view of cutting head and caster portions of a third embodiment of a lawn maintenance machine according to the present invention.
Figure 8B:
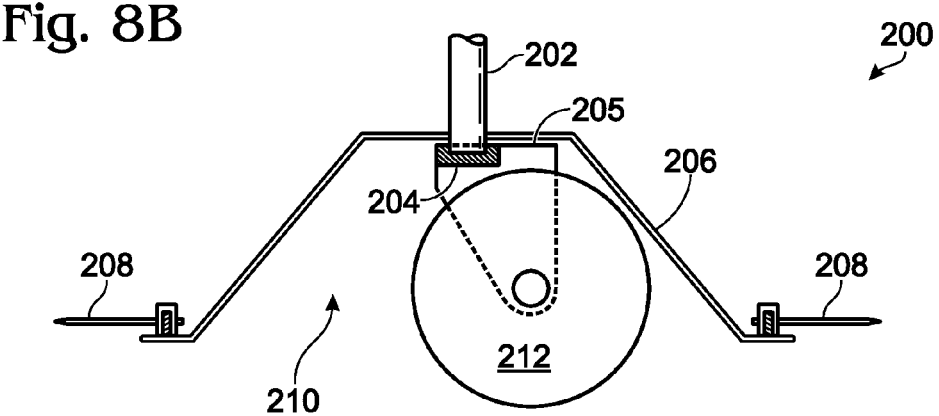
FIG. 8B is a detail view of a caster of the third embodiment machine.

FIGS. 8A and 8B show portions of an embodiment of a lawn maintenance machine 200 according to the present invention, machine 200 including: caster mounting post 202; swivel connection hardware 204; caster axle subassembly 205; recessed cutting head member 206; cutting blades 208; and caster member 212. The cutting head defines recess 210, which is used to accommodate caster axle sub-assembly 205 and caster member 212. This addition of a caster under the cutting head is thought to greatly improve the stability of the device because it is directly under the cutting head and blades which have some weight. In some embodiments there may also be an electric motor directly over the cutting head, which is another reason that the additional support provided by caster member 212 is helpful. Because post 202 is coaxial with the axis of rotation of the cutting head, the cutting head may rotate about the post without spinning the caster. Recess 210 allows the caster member to be a larger radius wheel than it could be in embodiments where the cutting head member is not recessed.

Figure 9A:
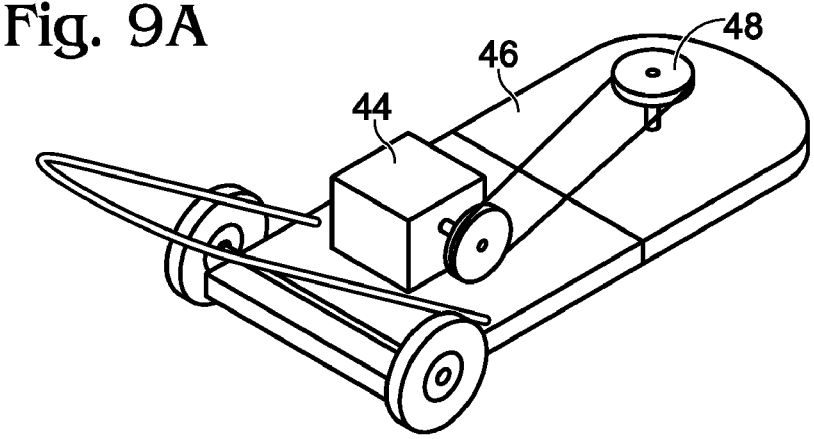
FIG. 9A is a perspective view of a fourth embodiment of a lawn maintenance machine according to the present invention, which uses a gasoline powered engine instead of the electric motor; in this configuration the gasoline powered engine is positioned on the main deck with a belt driving the cutting head through the use of a pulley.
Figure 9B:
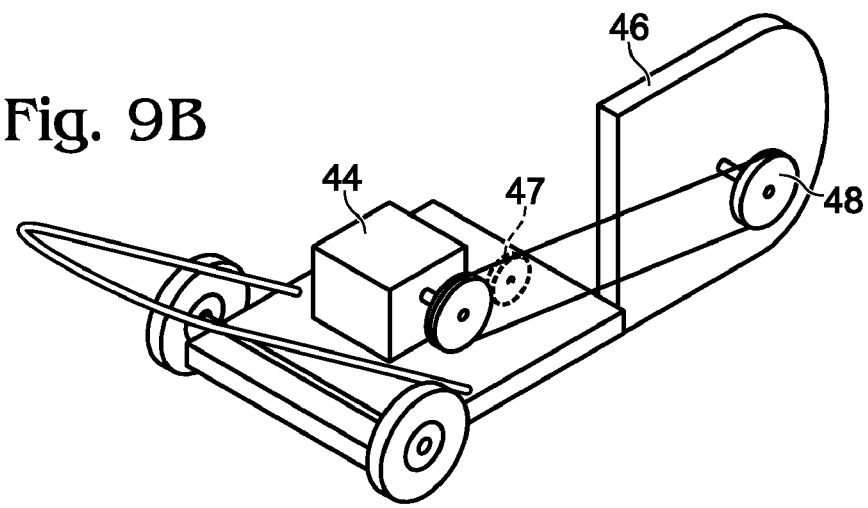
FIG. 9B is another perspective view of the fourth embodiment machine.

FIGS. 9A (deck in mowing position) and 9B (deck in edging position) show two perspective views of an alternative embodiment that uses a gasoline powered engine 44 instead of the electric motor. In this configuration the gasoline powered engine 44 is positioned on the main deck with a belt 46 driving the cutting head through the use of a pulley 48. The embodiment of FIGS. 9A and 9B also include caster 47.

Figure 10:
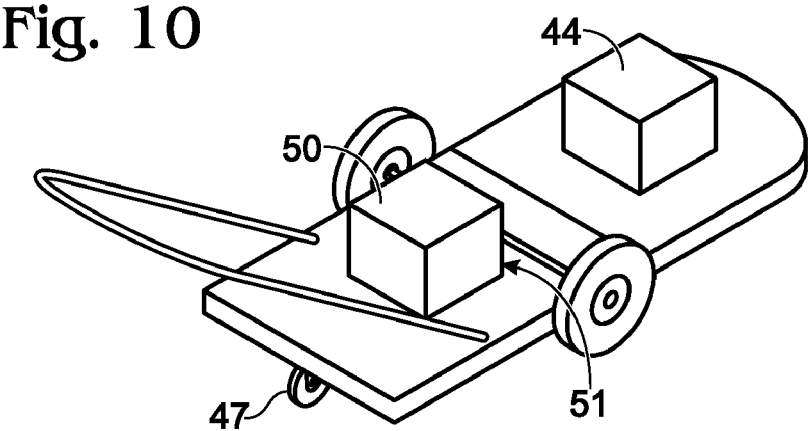
FIG. 10 is a perspective view of a fifth embodiment of a lawn maintenance machine according to the present invention, which uses a gasoline powered engine instead of the electric motor; in this configuration the gasoline powered engine is positioned on the forward deck and drives the cutting head directly; a counterbalancing weight in the form of the fuel tank and added weight as necessary to maintain proper balance is positioned on the main deck.

FIG. 10 shows a perspective view of an alternative embodiment that uses a gasoline powered engine 44 instead of the electric motor. In this configuration the gasoline powered engine is positioned on the forward deck and drives the cutting head directly without a belt of other transmission mechanism. Counterbalancing weight 50, in the form of the fuel tank and added weight as necessary to maintain proper balance, is positioned on the main deck. The embodiment of FIG. 10 also includes caster 47.

Figure 11:
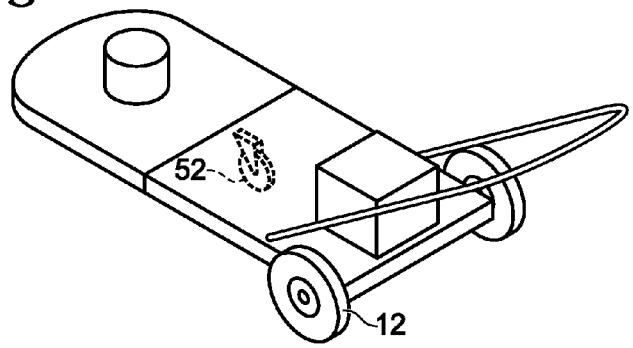
FIG. 11 is a perspective view of a sixth embodiment of a lawn maintenance machine according to the present invention, in which the two main wheels are positioned to the rear with a forward caster, instead of the two main wheels being forward with a rear caster.
Figure 13:
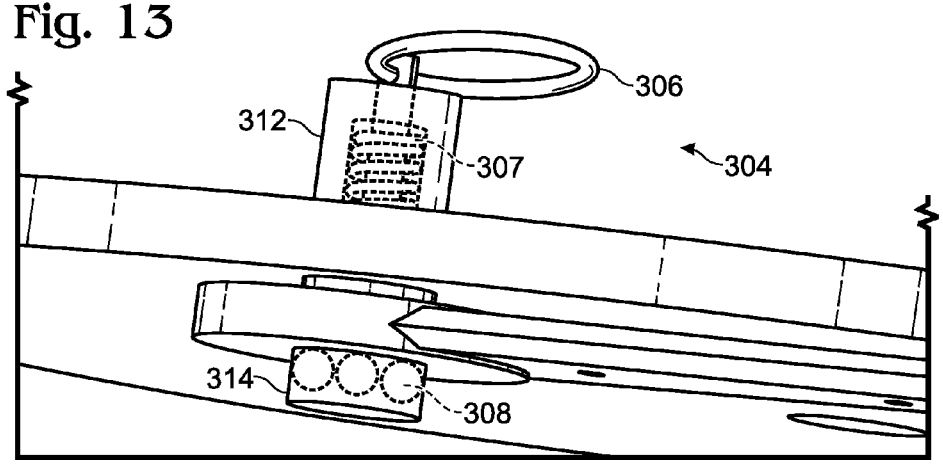
FIG. 13 is a detail view of a portion of a first embodiment of a cutting head sub-assembly for use in the present invention.
Figure 14:
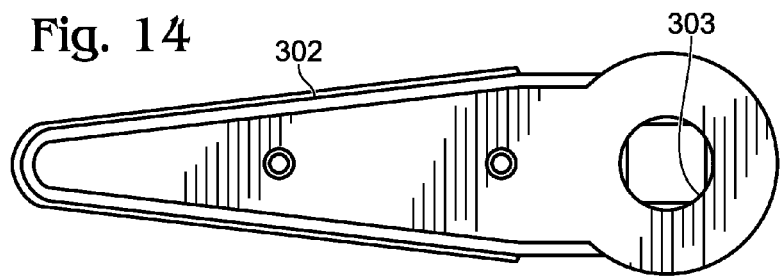
FIG. 14 is an orthographic top view of a cutting blade for use in the first embodiment cutting head sub-assembly.
Figure 15:
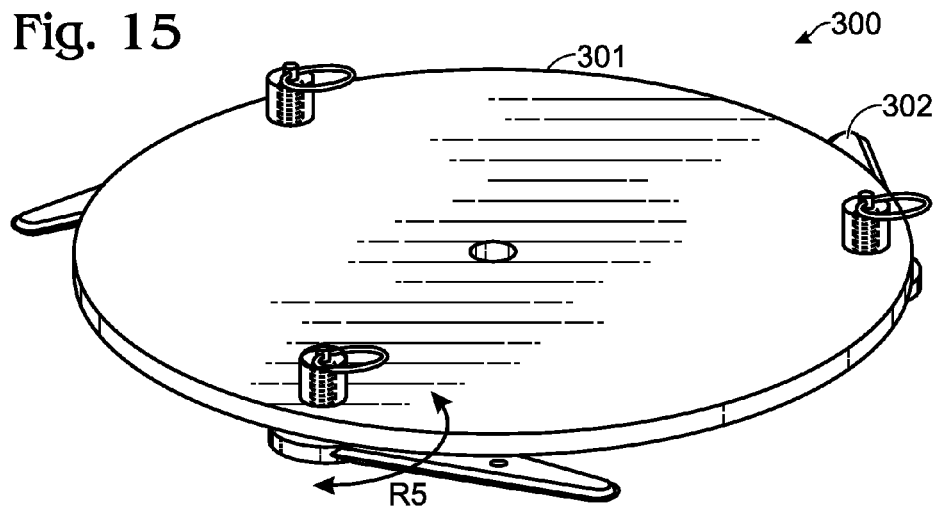
FIG. 15 is a perspective view of the first embodiment cutting head sub-assembly.
Figure 16:
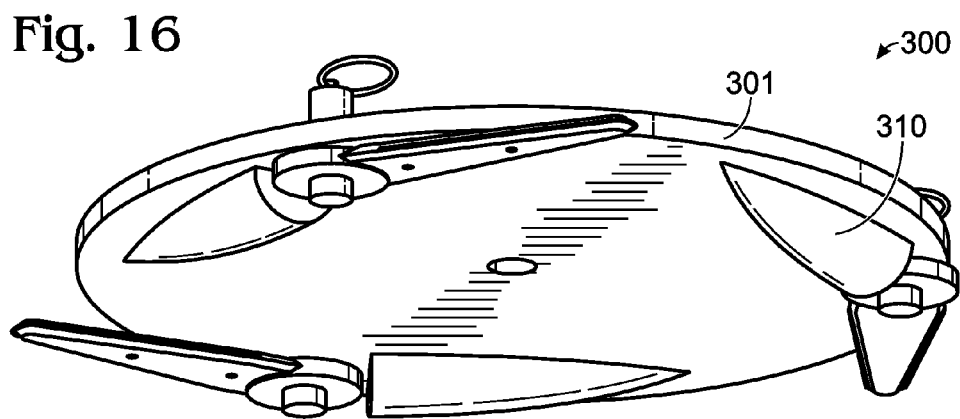
FIG. 16 is another perspective view of the first embodiment cutting head sub-assembly.

FIG. 11 shows a perspective view of an alternative embodiment in which the two main wheels 12 are positioned to the rear with a forward caster 52, instead of the two main wheels being forward with a rear caster (as in embodiment 10 discussed above).

FIGS. 12A and 12B show a perspective view and side view of a commercial embodiment of a lawn maintenance machine according to the present invention. The embodiment of FIGS. 12A and 12B includes adjustable-height handles 54, and right 56 and left 58 recessed storage compartment handles for spare filament line and metal blades.

FIGS. 13-16 show a cutting head sub-assembly 300, including: head member 301; blades 302; and blade securing mechanisms 304. The head member includes protrusions 310; Each blade 302 defines a securing hole 303. Each blade securing mechanism 304 includes: a release handle 306; torsion spring 307; retractable protrusions 308; fixed portion 312 and rotating portion 314.

The head securing mechanisms allow each blade to be changed quickly and easily, without the use of tools. In order to release a blade, the user: (i) pulls on release handle 306 to retract the retractable protrusions 308; and (ii) pulls the blade over the retracted protrusions and off of the body of the blade securing mechanism. In order to install a new blade, a user: (i) pulls on release handle 306 to retract the retractable protrusions 308; and (ii) pushes a new blade over the retracted protrusions and onto of the body of the blade securing mechanism.

The role of the torsion spring in the blade securing mechanism will now be discussed. The blade securing mechanism is structured and connected so that fixed portion 312 is at least substantially rigidly fixed to the head member, but rotating portion may rotate with respect to the head member about a central axis of the blade securing mechanism (that is, in the direction shown by double arrow R5 in FIG. 15). However, the rotating motion of the rotating portion is biased by torsional spring 307, which is connected at one end to the fixed portion and at the other end to the rotating portion. The rotating portion is mechanically connected to the blade. More specifically, the shape of securing hole of the blade, and the shape of the corresponding mating surface on the rotating portion of the blade securing mechanism are shaped so that the blade and the rotating portion will rotate together in the R5 direction. The rotational bias caused by the torsion spring will bias the rotating portion, and the blade connected to it, to rotate in the counterclockwise-R5 direction (in the perspective of FIG. 15), with respect to the head member, so that the blade is at least substantially within the footprint of the head member, in a non-cutting position.

Protrusions 310 act as a guard to protect the blades against collisions with hard objects, such as rocks. More specifically, the protrusions extend downwards from the underside of head member 301, and protrude further in the downwards directions than the bottom surfaces of the blades. In this way, hard objects under the underside of the head member will tend to contact the protrusions and not the blades. This helps prevent blade wear and blade breakage or bending. Protrusions 310 may also be located, sized and shaped to act as a stop, limiting the counterclockwise-R5 rotation of the blade once it is retracted into its non-cutting position.

When the cutting head member is rotated, about its central axis, in a cutting direction, this motion will cause a centrifugal force that tends to rotate the blade in the clockwise-R5 direction (in the perspective of FIG. 15), which will tend to rotate the blade radially outwards of the footprint of the head member, so that the blade occupies a cutting position. In fact, this centrifugal force is so great that the blade can perform mowing, trimming and/or edging operations on vegetation, even though the physical interference with the vegetation being cut will exert a force on the blade having a component in the counterclockwise-R5 direction (in the perspective of FIG. 15). Despite the urging of the torsion spring and the grass, the centrifugal force will generally be sufficient to maintain the blade in the cutting position while the head member is spinning in the cutting direction.

There are advantages to mounting the blade in a rotationally biased manner to the head member, instead of mounting the blade rigidly, as is conventional. When the blades are spinning and in the cutting position, they will have less kinetic energy at a given rotational speed because some kinetic energy they would have in a rigid mounted configuration is required to offset the torsional bias of the torsional spring. This makes the lawn maintenance machine safer, and also can reduce the discomfort and component damage occasioned by mechanical shocks caused by impacts between the blade and a hard object. The torsionally biased blade mounting will also impart some "give" to the blade to help accommodate impacts with hard objects. While the torsional spring in a blade securing mechanism is one preferred way to impart torsional bias to the blade, there are other alternative ways. For example, a torsion spring could be built into the head member itself, without providing any separate blade securing mechanism. As a further alternative, other bias inducing structures (now known or to be developed in the future) could be used, such as an electric clutch, a magnetic bias inducing mechanism, a linear spring connected between the blade and the head member, elastic members (other than coil springs) imparting bias (with linear and/or torsional deformations of the elastic body) and so on.

Figure 17:
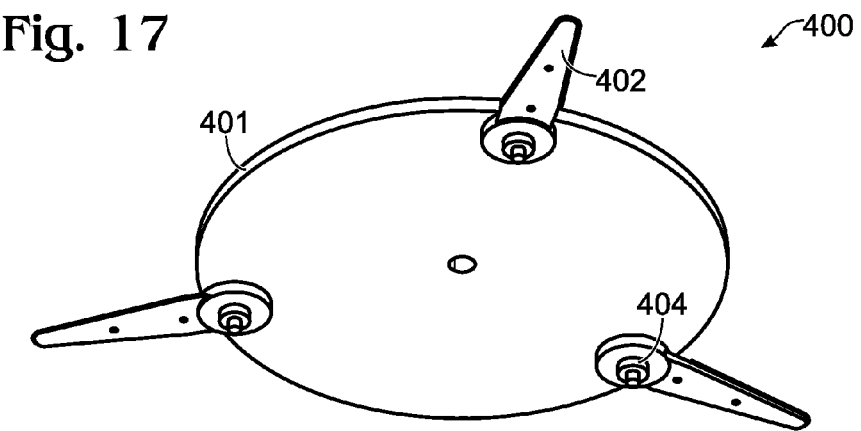
FIG. 17 is a perspective view of a second embodiment of a cutting head sub-assembly for use in the present invention.
Figure 18:
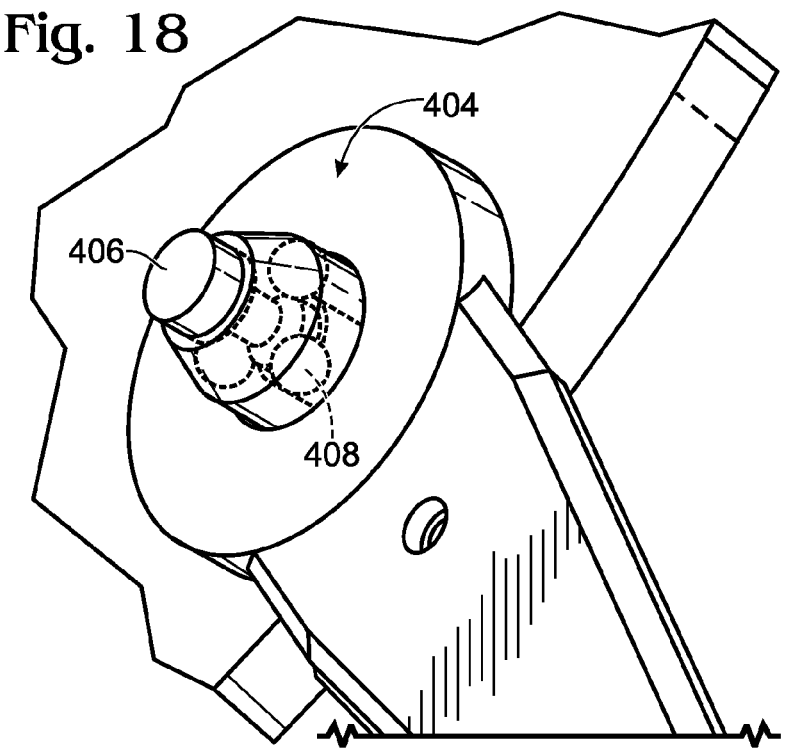
FIG. 18 is another perspective detail view of a portion of the second embodiment cutting head sub-assembly.

FIGS. 17 and 18 show a cutting head sub-assembly 400, including: head member 401; blades 402 and blade securing mechanisms 404. Both FIGS. 17 and FIG. 18 show the top side of head member 401—in this embodiment, the blades are mechanically connected at the top surface of the cutting head and not the bottom surface. Each blade securing mechanism includes: biased release button 406 and retractable protrusions 408. While sub-assembly 400 is somewhat similar to sub-assembly 300 (discussed above), there are differences. One difference is that the biased release button, located on the same side of the head member as the blade, is used to selectively retract the blade securing protrusions to release the blade and/or allow for installation of a new blade. The blade securing mechanisms of sub-assembly 400 may or may not include structures and connections for imparting a rotational bias to the blade (such as the torsion spring discussed above in connection sub-assembly 300).

Figure 26:
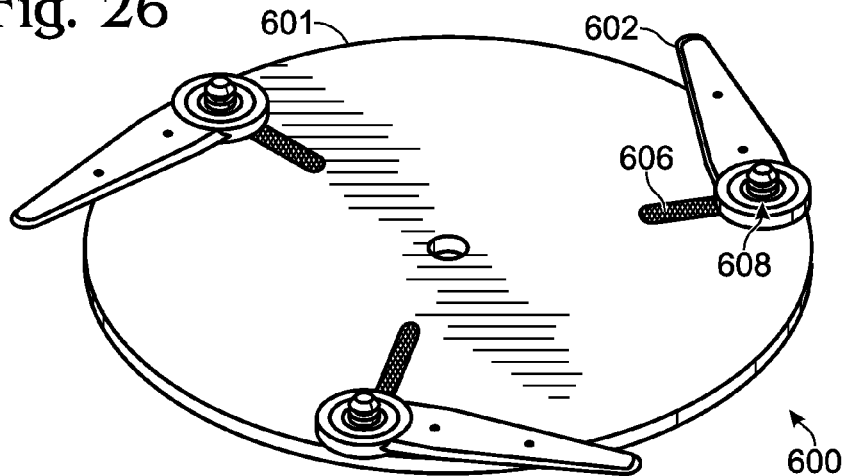
FIG. 26 is a perspective view of a fourth embodiment of a cutting head sub-assembly for use in the present invention.

FIG. 26 shows cutting head sub-assembly 600 including: head member 601; blades 602; slot gasket member 606; and annular gasket member 608. The gasket members may be any resilient and elastic material (now known or to be developed in the future) including rubber, mesh material, fluid filled members and so on. Slot gasket member 606 could be replaced by a linear springs (for example, coil springs) located along the slots in head member 601. At the rotational interface between the blade and the head member, there may be a torsion spring in addition to annular gasket 608.

In operation, as the speed of the rotation of the cutting head member increases, centrifugal force in the blades will cause the blades to rotate radially outwards from the footprint of the head member. The annular gasket provides rotational direction bias and shock absorption, in the rotational direction around the axis defining the connection between the blade and cutting member (for example, the central axis of the blade securing hardware). The rotation of the blades, about the axes of their respective connections to the head member 601 will tend to twist the annular gasket (and any additional torsional springs which may be present) out of their at-rest positions. By its tendency to untwist back to its at-rest position, the annular gasket may bias the blades into a non-cutting position as cutting head rotational speed decreases toward zero. On the other hand, an increase in cutting head rotational speed will rotate the blades so that they are substantially aligned with the radial direction of the head member into a cutting position.

Slot gasket member 606 provides linear direction bias in the radial inwards direction defined by head member 601. When the blades are not spinning, they are pulled radially inwards by slot gasket 606, so that the gasket is at its at-rest position. However, as head member 601 starts to rotate, and as its rotational speed is increases, centripetal force will tend to pull the blades to translate in the radially outwards direction. This means that the cutting radius gets larger and larger as cutting head member spins faster and faster, and the blades translate outward against the bias of slot gasket 606. This outward radially outwards translation of the cutting blades is helpful because it allows a user to control the distance that the blades extend radially of the head member. For example, at a slower rotational speed, the blades may be sized so that they do not extend past the deck (see FIG. 1 at reference number 24) of the lawn maintenance machine, which is preferred for mowing operations where the clippings are to be bagged and/or mulched. On the other hand, by increasing rotational speed, the blades may be sized so that they do extend past the deck for trimming and/or edging operations.

Figure 27:
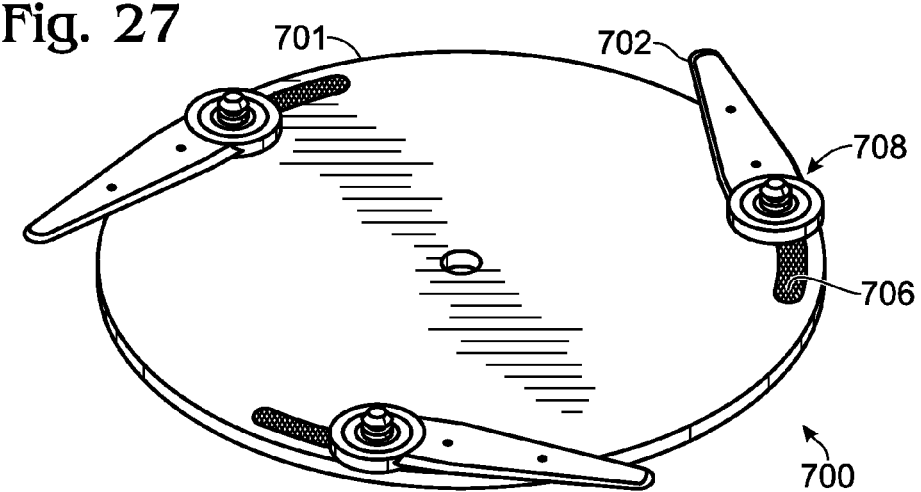
FIG. 27 is a perspective view of a fifth embodiment of a cutting head sub-assembly for use in the present invention.

FIG. 27 shows cutting head sub-assembly 700 including: head member 701; blades 702; slot gasket members 706; and annular gasket members 708. In this embodiment, slot gasket 706 provides give, bias and shock absorption to the blades in the angular direction defined by cutting head 701. This reduces kinetic energy of the blades, which is good from a safety standpoint, and a blade wear and breakage standpoint.

Figure 28:
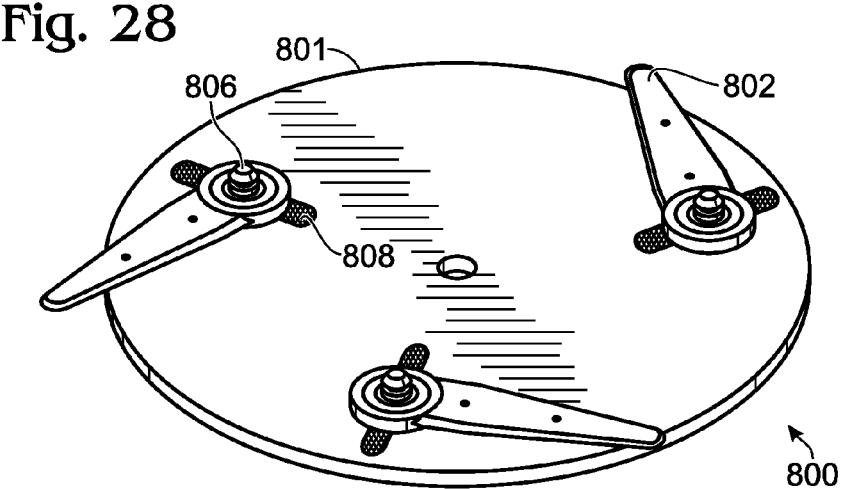
FIG. 28 is a perspective view of a sixth embodiment of a cutting head sub-assembly for use in the present invention.

FIG. 28 shows cutting head sub-assembly 800 including: head member 801; blades 802; torsion spring mechanisms 806; and slot gasket members 808. In this embodiment, slot gasket 808 is used in conjunction with a torsion spring. The torsion spring provides give and bias in the rotational direction about the axis of torsion spring 806. Slot gasket 808 provides give, bias and cutting radius adjustability by providing for biased translation of the blade in the radial direction defined by cutting head member 801.

Figure 29:
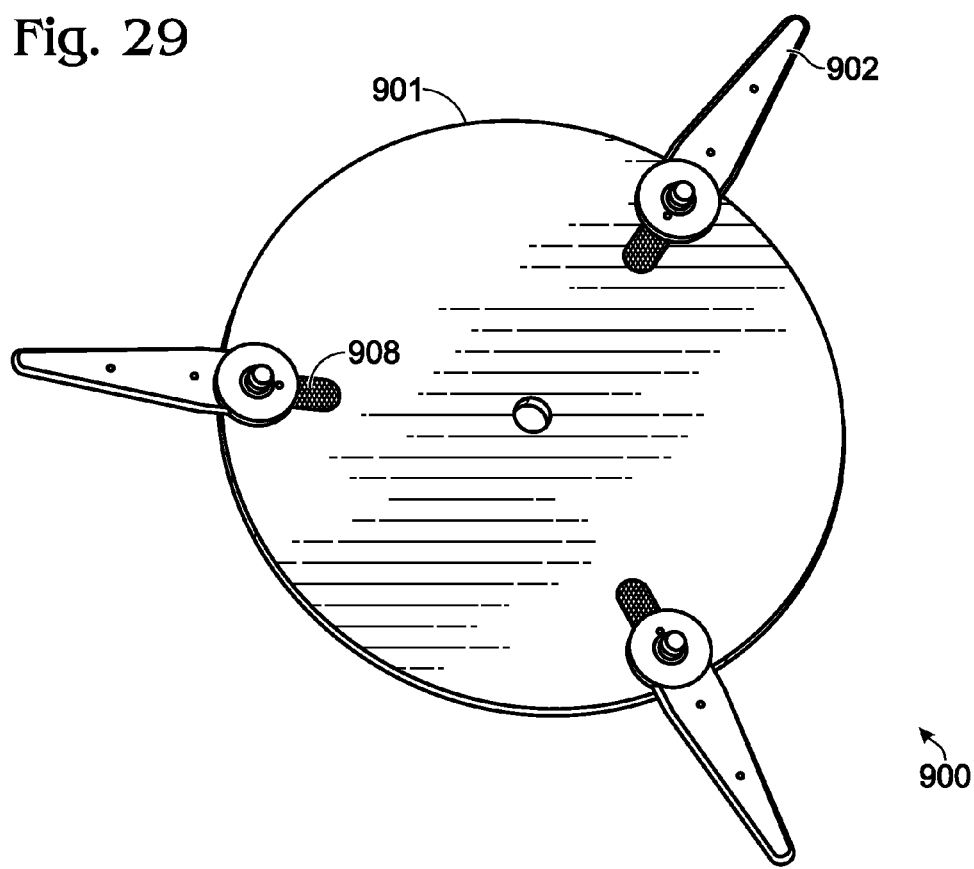
FIG. 29 is a perspective view of a seventh embodiment of a cutting head sub-assembly for use in the present invention.

FIG. 29 shows cutting head sub-assembly 900 including: head member 901; blades 902; and slot gasket members 908. In this embodiment, the blades do not rotate with respect to the cutting head, but they translate in a biased manner, in the radially inwards/outwards direction defined by cutting head 901.

Figure 30:
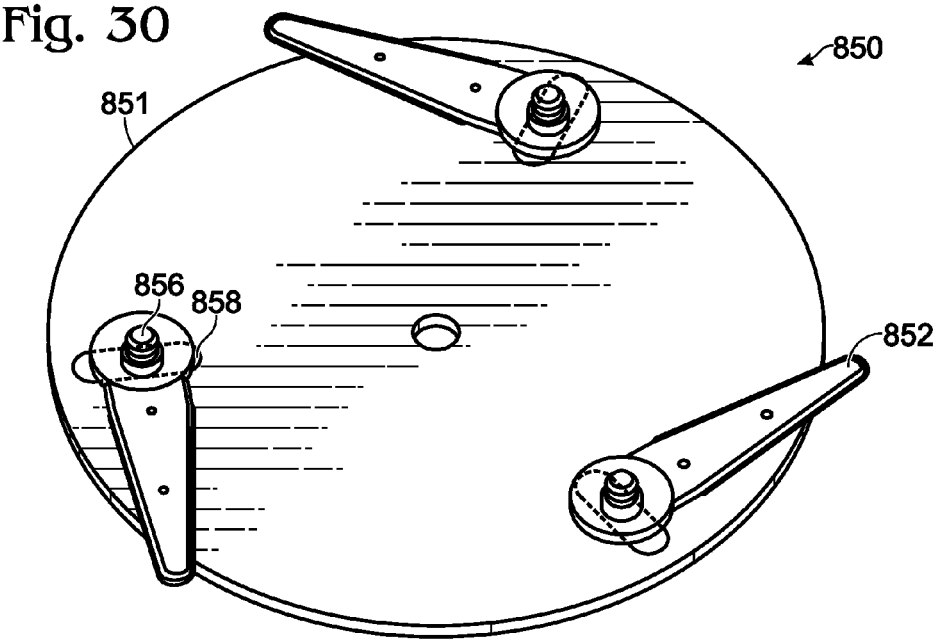
FIG. 30 is a perspective view of an eighth embodiment of a cutting head sub-assembly for use in the present invention.

FIG. 30 shows cutting head sub-assembly 850 including: head member 851; blades 852; torsion spring connector 856; and slot gasket member 858.

Figure 31:
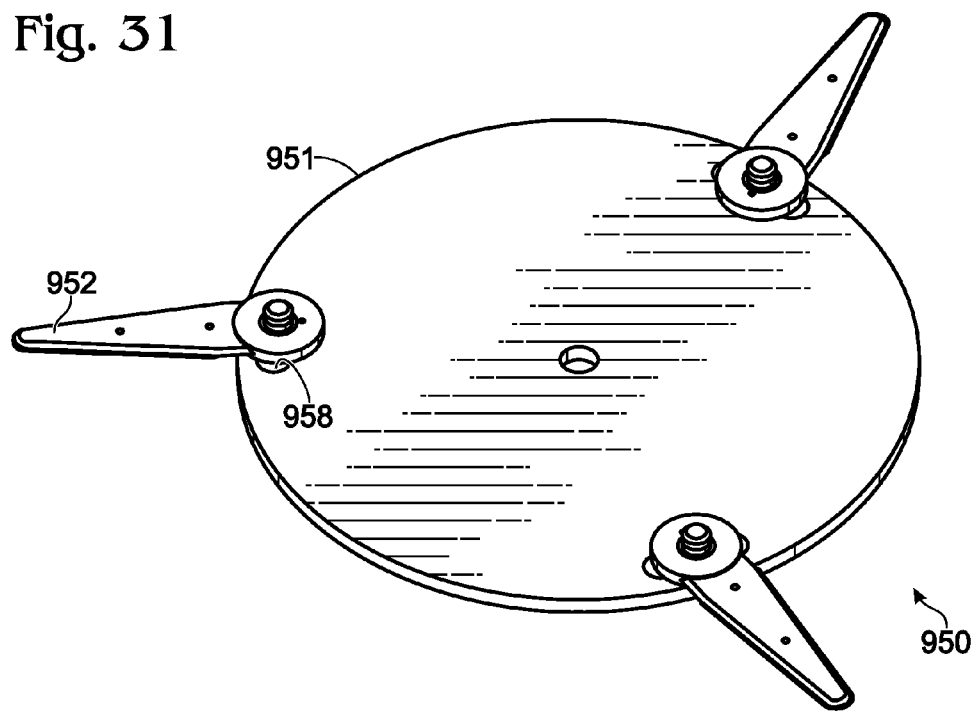
FIG. 31 is a perspective view of a ninth embodiment of a cutting head sub-assembly for use in the present invention.

FIG. 31 shows cutting head sub-assembly 950 including: head member 951; blades 952; and slot gasket members 958. In this embodiment, the blades do not rotate with respect to the cutting head, but they translate in a biased manner, in the tangent direction defined by cutting head 951.

Now that some of the embodiments of the present invention have been discussed in detail, some possible variations will be discussed.

As noted above, at least some embodiments of the present invention can switch between alternative sets of cutting implements. As discussed above, one way of doing this is to change the rotation direction of rotation of the cutting head (that is, clockwise to counterclockwise). Alternatively, the direction of rotation of the motor may be reversed only temporarily to switch between sets of cutting implements, with the cutting head always rotating in the same direction (clockwise or counterclockwise) during the cutting operation. As a further alternative, the direction of rotation used to switch cutting implements may be the same of the direction of rotation used for spinning the head member during cutting operations. Alternatively, the switch between set of cutting implements may not be driven by rotation of the cutting head at all, but might be driven by separate mechanical, electronic, optical and/or magnetic switches and linkages that operate independently of the cutting head rotation.

In some embodiments of the present invention, there will be a bi-directional motor in order to cause the bi-directional rotational motion needed to switch between cutting implements. In other embodiments of the present invention, bi-directional motion will not be required to switch between alternative sets of cutting elements, and a bi-directional motor will not be required. In still other embodiments of the present invention where bi-directional motion is desired or required, a single-direction motor will be used, but the transmission hardware between the motor and the rotated members (for example, the head member, the first gear, etc.) will be structured and connected to allow rotational direction to be selectively changed.

In some embodiments of the present invention, a multiple speed motor may be used. The selection of motor speed may be used as the mechanism to select between and among sets of alternative cutting implements. For example, in a lawn maintenance machine with a two speed motor, low speed may be used to select a set of blade style cutting implements, and high speed may be used to select a set of filament style cutting implements. In this way, the use of two different speed settings will limit the amount of kinetic energy that the cutting implements have when the blades are selected as the set of cutting implements. This can be advantageous from a safety standpoint and from a blade life standpoint. It is generally less important to limit the kinetic energy of a filament style cutting element because these have a lower mass, and therefore have a lower kinetic energy than a blade spinning at the same rotational speed.

As discussed above, the blade(s) and or filament(s) may or may not extend past the deck. When these cutting implements do extend past the deck, and further when the cutting head is in the horizontal position, this is referred to as trimming. When these cutting implements do not extend past the deck, and further when the cutting head is in the horizontal position, this is referred to as mowing. Lawn maintenance machines according to the present invention may be sized, shaped and connected so that the cutting implements never extend past the deck. Other lawn maintenance machines according to the present invention may be sized, shaped and connected so that the cutting implements always extend past the deck. Still other lawn maintenance machines according to the present invention may be sized, shaped and connected so that some cutting implements never extend past the deck (for example, the blade(s)), while other cutting implements always extend past the deck (for example, the filament(s)). Still other lawn maintenance machines according to the present invention may have radially positionally adjustable cutting implements so that the cutting implements may be adjusted between an extending-past-the-deck position and an under-the-deck position. Still other lawn maintenance machines according to the present invention may have positionally adjustable decks so that the deck may be adjusted between a covering-the-cutting implements position and an exposing-the-cutting-implements position.

According to some embodiments of the present invention, the deck may pivot through an angular range of motion −15 degrees through +135 degrees (with 0 degrees being horizontal and +90 degrees being vertical). Some embodiments of the present invention can lift the front up 45 degrees.

As discussed above, but now re-emphasized, various embodiments of the present invention may have various numbers of wheels and various placements with respect to the footprint of the deck. Other types of support may be present such as rolling spheres, sliding hardware (for example, snow mobile type blades), an endless track conveyor and so on.

In some embodiments of the present invention, the selection of a set of cutting implements may be influenced, in whole or in part, by the rotational position of the cutting head sub-assembly. For example, in some embodiments of the present invention, the blades and filaments will be mechanically connected so that the filaments are always selected as the cutting element when the cutting head sub-assembly is in the edging (that is, vertical) position, but that the implements can be switched between filaments and blades when the cutting head sub-assembly is in the mowing (horizontal) position.

An airfoil may be used on the cutting blades of the present invention in order to create drag to decrease the kinetic energy of the blades for safety and/or shock reduction reasons.

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

Gasket member: any elastic and resilient member; gasket should not be taken to necessarily imply any sort of mechanical and/or fluid tight sealing functionality.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering(s) of the claimed steps is particularly mentioned or discussed in this document—in other words, any step order discussed in the above specification shall be considered as required by a method claim only if the step order is explicitly set forth in the words of the method claim 1tself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. An assembly for use in a lawn maintenance machine having a frame and a motor, the assembly comprising:
    a cutting head member; and
    an implement selection hardware set;
    wherein:
    the cutting head member is operatively connectable to the motor and mechanically connectable to the frame so that, when the cutting head member is operatively connected to the motor and mechanically connected to the frame, rotation of the motor will drive the cutting head member to rotate in the first angular direction about its central axis;
    the implement selection hardware set comprises an implement selection member and a first cutting implement;
    the implement selection member is rotatably mechanically connected to the cutting head member so that it can rotate with respect to the cutting head member about a selection member axis;
    the first cutting implement of the first type is rotatably mechanically connected to the implement selection member so that it can rotate with respect to implement selection member about an implement connection axis; and
    when the assembly is connected to the frame, the first cutting implement can rotate in all of the following ways: (i) with respect to the frame, about the central axis of the cutting head member along with the implement selection member and the cutting head member, (ii) with respect to the cutting head member, about the implement selection axis along with the implement selection member, and (iii) with respect to the implement selection member, about the implement connection axis.

2. An assembly for use in a lawn maintenance machine having a frame and a motor, the assembly comprising:
    a cutting head member;
    an implement selection member;
    a first cutting implement; and
    a second cutting implement;
    wherein:
    the cutting head member is mechanically connectable to the motor so that rotation of the motor causes the cutting head member to rotate when the cutting head member is connected to the motor;
    the implement selection member is rotatably mechanically connected to the cutting head member;
    the first cutting implement is mechanically connected to the implement selection member;
    the second cutting implement is mechanically connected to the implement selection member; and
    the implement selection member can be rotated, with respect to the cutting head member, between at least: (i) a first position where the first cutting implement(s) are in a cutting position and the second set of cutting implement(s) are in a non-cutting position, and (ii) a second position where the second set of cutting implements are in a cutting position and the first set of cutting implements are in a non-cutting position.

3. The machine of claim 2 further comprising transmission hardware, wherein:
    the transmission hardware includes at least a first cam and a first follower slot;
    the first cam and first follower slot are engaged with each other; and
    the transmission hardware is structure, located and/or mechanically connected so that rotation of the motor will selectively drive rotation of the implement selection in order to rotate the implement selection member between its first position and its second position.

4. The machine of claim 2 further including a first rotational bias sub-assembly that is further structured, connected and located to rotationally mechanically connect the implement selection member to the cutting head member in a rotationally biased manner.

5. The machine of claim 4 wherein:
the first rotational bias sub-assembly comprises a first gasket member; and
the first rotational bias sub-assembly provides at least a portion of the rotational bias by elastic deformation of the first gasket member.

6. The machine of claim 5 wherein:
the first rotational bias sub-assembly comprises a first torsion spring; and
the first torsion spring provides at least a portion of the rotational bias by twisting of the torsion spring away from its default position.

7. The machine of claim 2 further including a first rotational bias sub-assembly that is further structured, connected and located to rotationally mechanically connect the implement selection member to the first cutting implement in a rotationally biased manner.

8. The machine of claim 7 wherein:
the first rotational bias sub-assembly comprises a first gasket member; and
the first rotational bias sub-assembly provides at least a portion of the rotational bias by elastic deformation of the first gasket member.

9. The machine of claim 7 wherein:
the first rotational bias sub-assembly comprises a first torsion spring; and
the first torsion spring provides at least a portion of the rotational bias by twisting of the torsion spring away from its default position.

10. The machine of claim 7 further including a second rotational bias sub-assembly that is further structured, connected and located to rotationally mechanically connect the implement selection member to the cutting head member in a rotationally biased manner.

11. An assembly for use in a lawn maintenance machine having a frame and a motor, the assembly comprising:
a cutting head assembly; and
an implement selection hardware set;
wherein:
the cutting head assembly comprises a cutting head member, a first set of cutting implements comprising at least one cutting implement and a second set of cutting implements comprising at least one cutting implement;
the first set of cutting implements includes a first cutting implement of a first type;
the second set of cutting implements includes a first cutting implement of a second type;
the cutting head member defines a central axis and a first angular direction about its central axis;
the cutting head member is mechanically connectable to the motor so that, when the cutting head member is connected to the motor, rotation of motor drive the cutting head member to rotate in the first angular direction;
the implement selection hardware set allows selection between at least:(i) a first operational mode where the first set of cutting implements is configured to be in a cutting position and the second set of cutting implements is configured to be in a non-cutting position, and (ii) a second operational mode where the second set of cutting implements is configured to be in a cutting position and the first set of cutting implements is configured to be in a non-cutting position; and
the implement selection hardware set is structured so that, when the motor is operatively connected to the implement selection hardware set, rotation of the motor will drive the implement selection hardware set to move the first set of cutting implements and the second set of cutting implements in order to switch between the first operational mode and the second operational mode without reversing a direction of rotation of the motor;
the cutting head assembly further comprises a set of implement selection sub-assemblyies;
each implement selection sub-assembly of the set of implement selection sub-assembly(ies) comprises an implement selection member that is rotatably mechanically connected to the cutting head member so that it can rotate, with respect to the cutting head member, between a first position and a second position;
each implement selection member is mechanically connected to at least one first cutting implement of the first type from the first set of cutting implements;
each implement selection member is mechanically connected to at least one second cutting implement of the second type from the second set of cutting implement;
the rotation of the motor is used to drive the implement selection members of the set of implement selection sub-assemblies between the first position and the second position in order to switch between the first operational mode and the second operational mode
the implement selection members of the set of implement selection sub-assembly(ies) are generally disc shaped and define a second angular direction; and
the first cutting implement and second cutting implement are respectively mechanically connected to each implement selection member of the set of implement selection sub-assemblies so that they are at substantially different locations in the second angular direction; and
the first cutting implement and second cutting implement are respectively mechanically connected to each implement selection member of the set of implement selection sub-assemblies so that they are approximately 180 degrees apart in the second angular direction.

12. An assembly for use in a lawn maintenance machine having a frame and a motor, the assembly comprising:
a cutting head member;
an implement selection member;
a first cutting implement; and
a second cutting implement;
wherein:
the cutting head member is mechanically connectable to the motor so that rotation of the motor causes the cutting head member to rotate when the cutting head member is connected to the motor;
the implement selection member is rotatably mechanically connected to the cutting head member;
the first cutting implement is mechanically connected to the implement selection member;
the second cutting implement is mechanically connected to the implement selection member; and
the implement selection member can be rotated, with respect to the cutting head member, between at least: (i) a first position where the first cutting implements are in a cutting position and the second set of cutting implements are in a non-cutting position, and (ii) a second position where the second set of cutting implements are in a cutting position and the first set of cutting implements are in a non-cutting position;

the transmission hardware includes at least a first gear and a second gear;
the first gear selectively drives the rotation of the second gear; and
the transmission hardware is structure, located and mechanically connected so that rotation of the motor will selectively drive rotation of the implement selection in order to rotate the implement selection member between its first position and its second position.

* * * * *

UNITED STATES PATENT AND TRADEMARK OFFICE
CERTIFICATE OF CORRECTION

| | | |
|---|---|---|
| PATENT NO. | : 8,186,135 B2 | |
| APPLICATION NO. | : 12/824856 | |
| DATED | : May 29, 2012 | |
| INVENTOR(S) | : Joseph A. Leonardi et al. | |

It is certified that error appears in the above-identified patent and that said Letters Patent is hereby corrected as shown below:

Column 19, line 59 before "motor" please insert the word --the-- after the word "motor" please insert the word --will--

Signed and Sealed this
Twenty-eighth Day of August, 2012

David J. Kappos
*Director of the United States Patent and Trademark Office*